US011480777B2

(12) United States Patent
Shiraishi

(10) Patent No.: US 11,480,777 B2
(45) Date of Patent: *Oct. 25, 2022

(54) OBSERVATION DEVICE, OBSERVATION METHOD, AND OBSERVATION DEVICE CONTROL PROGRAM STORAGE MEDIUM

(71) Applicant: FUJIFILM Corporation, Tokyo (JP)

(72) Inventor: Yasushi Shiraishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

This patent is subject to a terminal disclaimer.

(21) Appl. No.: 16/749,068

(22) Filed: Jan. 22, 2020

(65) Prior Publication Data

US 2020/0158999 A1    May 21, 2020

Related U.S. Application Data

(63) Continuation of application No. PCT/JP2018/020599, filed on May 29, 2018.

(30) Foreign Application Priority Data

Aug. 30, 2017 (JP) .............................. JP2017-165264
Nov. 17, 2017 (JP) .............................. JP2017-221446

(51) Int. Cl.
*G02B 21/00* (2006.01)
*G02B 21/34* (2006.01)

(52) U.S. Cl.
CPC ......... *G02B 21/008* (2013.01); *G02B 21/006* (2013.01); *G02B 21/0044* (2013.01); *G02B 21/34* (2013.01); *G02B 21/0032* (2013.01)

(58) Field of Classification Search
CPC .................. G02B 21/008; G02B 21/0044; G02B 21/006; G02B 21/34; G02B 21/0032;
(Continued)

(56) References Cited

U.S. PATENT DOCUMENTS

2003/0184855 A1* 10/2003 Yasuda ................ G02B 21/241
359/383
2006/0066726 A1    3/2006 Kita
(Continued)

FOREIGN PATENT DOCUMENTS

EP       2 402 811 A2    1/2012
JP       H11-237344 A    8/1999
(Continued)

OTHER PUBLICATIONS

International Search Report issued in PCT/JP2018/020599; dated Aug. 28, 2018.
(Continued)

*Primary Examiner* — Mustak Choudhury
(74) *Attorney, Agent, or Firm* — Studebaker & Brackett PC

(57) ABSTRACT

The observation device includes an imaging optical system that includes an imaging lens forming an image of an observation target in a cultivation container, an operating section that performs at least one of a first operation of changing a focal length of the imaging optical system, a second operation of moving the imaging lens in an optical axis direction, or a fourth operation of moving the container in the optical axis direction, a detection section that detects a vertical position of the cultivation container, and an operation controller that controls the operating section based on the vertical position of the cultivation container.

18 Claims, 10 Drawing Sheets

(58) Field of Classification Search
CPC .................. G02B 21/367; G02B 21/025; G02B 21/0088; G02B 21/14; G02B 21/244; G02B 21/361; G02B 7/28
See application file for complete search history.

(56) References Cited

U.S. PATENT DOCUMENTS

| | | | |
|---|---|---|---|
| 2011/0063736 A1 | 3/2011 | Obrebski et al. | |
| 2012/0194729 A1* | 8/2012 | Zahniser | G02B 21/244 348/E5.024 |
| 2014/0210981 A1* | 7/2014 | Stauffer | G01B 11/06 348/79 |
| 2015/0130920 A1* | 5/2015 | Zou | G02B 21/006 348/79 |

FOREIGN PATENT DOCUMENTS

| | | |
|---|---|---|
| JP | 2003-295065 A | 10/2003 |
| JP | 2006-098995 A | 4/2006 |
| JP | 2011-081211 A | 4/2011 |
| JP | 2015-523587 A | 8/2015 |
| JP | 2016-024042 A | 2/2016 |
| WO | 2013/165576 A1 | 11/2013 |

OTHER PUBLICATIONS

International Preliminary Report on Patentability and Written Opinion issued in PCT/JP2018/020599; dated Mar. 3, 2020.

An Office Action; "Notice of Reasons for Refusal," Mailed by the Japanese Patent Office dated May 26, 2020, which corresponds to Japanese Patent Application No. 2019-538977 and is related to U.S. Appl. No. 16/749,068 with English language translation.

An Office Action mailed by the Korean Intellectual Property Office dated Jun. 20, 2021, which corresponds to Korean Patent Application 10-2020-7002506 and is related to U.S. Appl. No. 16/749,068; with English language translation.

The extended European search report issued by the European Patent Office dated Aug. 21, 2020, which corresponds to European Application No. 18849946.1-1020 and is related to U.S. Appl. No. 16/749,608.

* cited by examiner

MOVEMENT DIRECTION
(GOING WAY)

MOVEMENT DIRECTION
(RETURNING WAY)

MOVEMENT DIRECTION
(GOING WAY)

OBSERVATION DEVICE, OBSERVATION METHOD, AND OBSERVATION DEVICE CONTROL PROGRAM STORAGE MEDIUM

CROSS-REFERENCE TO RELATED APPLICATIONS

This application is a Continuation of PCT International Application No. PCT/JP2018/020599 filed on May 29, 2018, which claims priority under 35 U.S.C. § 119(a) to Japanese Patent Application No. 2017-165264 filed on Aug. 30, 2017 and Japanese Patent Application No. 2017-221446 filed on Nov. 17, 2017. Each of the above application(s) is hereby expressly incorporated by reference, in its entirety, into the present application.

BACKGROUND OF THE INVENTION

1. Field of the Invention

The present invention relates to an observation device, an observation method, and an observation device control program for observing an entire image of an observation target by relatively moving a container in which the observation target is accommodated and an imaging optical system that forms an image of the observation target.

2. Description of the Related Art

In the related art, a method for capturing an image of a multipotential stem cell such as an embryonic stem (ES) cell or an induced pluripotent stem (iPS) cell, a differentiated and induced cell, or the like using a microscope or the like, and capturing a feature of the image to decide a differentiation state of the cell, or the like has been proposed.

The multipotential stem cell such as an ES cell or an iPS cell is able to be differentiated into cells of various tissues, and may be applied to regenerative medicine, development of medicines, explanation of diseases, or the like.

On the other hand, in a case where a cell is imaged using a microscope as described above, in order to acquire a high-magnification wide view image, for example, a so-called tiling imaging technique for scanning the inside of a range of a cultivation container such as a well plate in accordance with an observation region of an imaging optical system and capturing an image for each observation region, and then, combining the images for the respective observation regions has been proposed.

SUMMARY OF THE INVENTION

In a case where the image for each observation region is captured, a focal position of the imaging optical system is mostly set to a bottom surface of the cultivation container. However, there is a manufacturing tolerance of the order of millimeters in the thickness of a bottom portion of the cultivation container. Thus, in a case where high magnification capturing is performed, the focal position needs to be set for each observation region. On the other hand, it is desirable to reduce a cell imaging time, and to provide a device capable of performing high-speed imaging.

However, in a related-art auto-focus control method, about 2 seconds are necessary for each observation region, and for example, in a case where the number of observation regions is 300, it takes 10 minutes only for the time necessary for the auto-focus control, which makes it difficult to perform high-speed imaging.

JP2011-081211A discloses a method for precedently measuring, at a time point when an image of a certain observation region is captured, a focal position at a region contiguous to the observation region so as to shorten an imaging time and performing a focus control using the focal position that is previously measured to perform capturing of images.

However, according to JP2011-081211A, in a case where the focal position is measured, similar to the case of the related-art auto-focus control, since an image of the region contiguous to the observation region is captured and the focal position is measured on the basis of contrast of the image, it takes time for an arithmetic process. Accordingly, in a case where a stage is moved at high speed, there is a possibility that an operation process and an auto-focus control based on the arithmetic process and a result of the arithmetic process at a time point when an observation region reaches a measurement position do not match each other.

Further, JP2011-081211A merely discloses a method for moving an observation region in only one direction, and in the moving in only one direction, a scanning time in the observation region becomes extremely long.

In consideration of the above-mentioned problems, an object of the present invention is to provide an observation device, an observation method, and an observation device control program capable of performing an auto-focus control for each observation region at high speed and shortening a scanning time in observation regions in an entire range.

A first observation device according to the present invention comprises:

an imaging optical system that includes an imaging lens forming an image of an observation target in a container accommodating the observation target;

an imaging system that includes an imaging element capturing the image of the observation target formed by the imaging optical system;

an operating section that performs at least one of a first operation of changing a focal length of the imaging optical system, a second operation of moving the imaging lens in an optical axis direction, a third operation of moving the imaging element in the optical axis direction, or a fourth operation of moving the container in the optical axis direction;

a detection section that includes at least one displacement sensor detecting a vertical position of the container;

an operation controller that controls the operating section based on the vertical position of the container detected by the detection section;

a horizontal driving section that moves at least one of the container or the imaging optical system in a horizontal plane; and a scanning controller that scans the container by controlling the horizontal driving section to move an observation region of the imaging optical system, in which the detection section detects the vertical position of the container at a forward position of the observation region in a movement direction with reference to a position of the observation region of the imaging optical system with respect to the container and changes a position of the displacement sensor or the displacement sensor to be used in accordance with a change of the movement direction of the observation region.

In the first observation device according to the present invention, the operating section may perform a plurality of operations among the first operation, the second operation, the third operation, and the fourth operation.

A second observation device according to the present invention comprises:

an imaging optical system that includes an imaging lens forming an image of an observation target in a container accommodating the observation target;

an operating section that performs at least one of a first operation of changing a focal length of the imaging optical system, a second operation of moving the imaging lens in an optical axis direction, or a fourth operation of moving the container in the optical axis direction;

a detection section that includes at least one displacement sensor detecting a vertical position of the container;

an operation controller that controls the operating section based on the vertical position of the container detected by the detection section;

a horizontal driving section that moves at least one of the container or the imaging optical system in a horizontal plane; and a scanning controller that scans the container by controlling the horizontal driving section to move an observation region of the imaging optical system, in which the detection section detects the vertical position of the container at a forward position of the observation region in a movement direction with reference to a position of the observation region of the imaging optical system with respect to the container and changes a position of the displacement sensor or the displacement sensor to be used in accordance with a change of the movement direction of the observation region.

In the second observation device according to the present invention, the operating section may perform a plurality of operations among the first operation, the second operation, and the fourth operation.

In the first and second observation devices according to the present invention, the imaging optical system may further include an objective lens that forms an image of the observation target in the container, and the first operation may include at least one of an operation of changing a focal length of the imaging lens or an operation of changing a focal length of the objective lens.

The first and second observation devices according to the present invention may further comprise:

a focal length changing optical system that changes the focal length of the imaging optical system, in which the imaging optical system further includes an objective lens that forms an image of the observation target in the container, and the first operation includes at least one of an operation of changing a focal length of the imaging lens, an operation of changing a focal length of the objective lens, or an operation of changing the focal length of the imaging optical system by the focal length changing optical system.

In the first and second observation devices according to the present invention, the operating section may further perform a fifth operation of moving the objective lens in the optical axis direction.

The first and second observation devices according to the present invention may further comprise a focal length changing optical system that changes the focal length of the imaging optical system, in which the first operation includes an operation of changing the focal length of the imaging optical system by the focal length changing optical system.

In the first and second observation devices according to the present invention, the imaging optical system may further include an objective lens that forms an image of the observation target in the container, and the operating section may further perform a fifth operation of moving the objective lens in the optical axis direction.

In the first and second observation devices according to the present invention, the detection section may include at least two displacement sensors that are provided in parallel in the movement direction of the observation region with the imaging optical system being interposed therebetween, and change the displacement sensor to be used in accordance with the change of the movement direction of the observation region.

In the first and second observation devices according to the present invention, the detection section may include a displacement sensor moving mechanism capable of moving the displacement sensor in the movement direction of the observation region between one side and the other side with the imaging optical system being interposed therebetween, and move the position of the displacement sensor from the one side to the other side in accordance with the change of the movement direction of the observation region.

In the first and second observation devices according to the present invention, the displacement sensor moving mechanism may include a guide mechanism that guides the displacement sensor from the one side to the other side.

In the first and second observation devices according to the present invention, after the vertical position of the container is detected by the detection section, the operation controller may control the operating section at a time point when a predetermined time elapses.

In the first and second observation devices according to the present invention, after the vertical position of the container is detected by the detection section, the operation controller may control the operating section at a time point when the observation region of the imaging optical system reaches the detected position or immediately before the observation region of the imaging optical system reaches the detected position.

In the first and second observation devices according to the present invention, the operation controller may change, in a case where a moving velocity of at least one of the container or the imaging optical system is changed by the scanning controller, the predetermined time in accordance with the moving velocity after the change.

In the first and second observation devices according to the present invention, in a case where the horizontal driving section causes at least one of the container or the imaging optical system to reciprocate, an acceleration/deceleration region of the reciprocation of at least one of the container or the imaging optical system may be set on both sides of a range of the container in a direction of the reciprocation, and a width of the acceleration/deceleration region in the direction of the reciprocation may be the same as an interval between the imaging optical system and the displacement sensor in the direction of the reciprocation.

In the first and second observation devices according to the present invention, the displacement sensor may be a laser displacement sensor.

The first and second observation devices according to the present invention may further comprise a vertical moving mechanism that integrally moves the imaging optical system, the operating section, and the displacement sensor in a vertical direction.

A first observation method according to the present invention is an observation method for moving at least one of a container accommodating an observation target or an imaging optical system including an imaging lens forming an image of the observation target in the container in a horizontal plane, and capturing the image of the observation target formed by the imaging optical system by an imaging element.

The Method Comprises:

a step of detecting a vertical position of the container at a forward position of an observation region in a movement direction with reference to a position of the observation region of the imaging optical system with respect to the container using at least one displacement sensor;

a step of performing based on the detected vertical position of the container at least one of a first operation of changing a focal length of the imaging optical system, a second operation of moving the imaging lens in an optical axis direction, a third operation of moving the imaging element in the optical axis direction, or a fourth operation of moving the container in the optical axis direction, and a step of changing a position of the displacement sensor or the displacement sensor to be used in accordance with a change of a movement direction of the observation region.

A second observation method according to the present invention is an observation method for moving at least one of a container accommodating an observation target or an imaging optical system including an imaging lens forming an image of the observation target in the container in a horizontal plane.

The Method Comprises:

a step of detecting a vertical position of the container at a forward position of an observation region in a movement direction with reference to a position of the observation region of the imaging optical system with respect to the container using at least one displacement sensor, a step of performing based on the detected vertical position of the container at least one of a first operation of changing a focal length of the imaging optical system, a second operation of moving the imaging lens in an optical axis direction, or a fourth operation of moving the container in the optical axis direction, and a step of changing a position of the displacement sensor or the displacement sensor to be used in accordance with a change of a movement direction of the observation region.

A first observation device control program according to the present invention is an observation device control program causing a computer to execute a procedure for moving at least one of a container accommodating an observation target or an imaging optical system including an imaging lens forming an image of the observation target in the container in a horizontal plane, and capturing the image of the observation target formed by the imaging optical system by an imaging element.

The program causes the computer to execute a procedure of detecting a vertical position of the container at a forward position of an observation region in a movement direction with reference to a position of the observation region of the imaging optical system with respect to the container using at least one displacement sensor, a procedure of performing based on the detected vertical position of the container at least one of a first operation of changing a focal length of the imaging optical system, a second operation of moving the imaging lens in an optical axis direction, a third operation of moving the imaging element in the optical axis direction, or a fourth operation of moving the container in the optical axis direction, and a procedure of changing a position of the displacement sensor or the displacement sensor to be used in accordance with a change of a movement direction of the observation region.

A second observation device control program according to the present invention is an observation device control program causing a computer to execute a procedure for moving at least one of a container accommodating an observation target or an imaging optical system including an imaging lens forming an image of the observation target in the container in a horizontal plane.

The program causes the computer to execute a procedure of detecting a vertical position of the container at a forward position of an observation region in a movement direction with reference to a position of the observation region of the imaging optical system with respect to the container using at least one displacement sensor, a procedure of performing based on the detected vertical position of the container at least one of a first operation of changing a focal length of the imaging optical system, a second operation of moving the imaging lens in an optical axis direction, or a fourth operation of moving the container in the optical axis direction, and a procedure of changing a position of the displacement sensor or the displacement sensor to be used in accordance with a change of a movement direction of the observation region.

A third observation device according to the present invention comprises:

a memory that stores an instruction to be executed by a computer; and a processor configured to execute the stored instruction, in which the processor executes a process for moving at least one of a container accommodating an observation target or an imaging optical system including an imaging lens forming an image of the observation target in the container in a horizontal plane, and capturing the image of the observation target formed by the imaging optical system by an imaging element.

The Process Includes:

detecting a vertical position of the container at a forward position of an observation region in a movement direction with reference to a position of the observation region of the imaging optical system with respect to the container using at least one displacement sensor, performing at least one of a first operation of changing a focal length of the imaging optical system, a second operation of moving the imaging lens in an optical axis direction, a third operation of moving the imaging element in the optical axis direction, or a fourth operation of moving the container in the optical axis direction based on the detected vertical position of the container, and changing a position of the displacement sensor or the displacement sensor to be used in accordance with a change of a movement direction of the observation region.

A fourth observation device according to the present invention comprises:

a memory that stores an instruction to be executed by a computer, and a processor configured to execute the stored instruction.

The processor executes a process for moving at least one of a container accommodating an observation target or an imaging optical system including an imaging lens forming an image of the observation target in the container in a horizontal plane.

The Process Includes:

detecting a vertical position of the container at a forward position of an observation region in a movement direction with reference to a position of the observation region of the imaging optical system with respect to the container using at least one displacement sensor, performing at least one of a first operation of changing a focal length of the imaging optical system, a second operation of moving the imaging lens in an optical axis direction, or a fourth operation of moving the container in the optical axis direction based on the detected vertical position of the container, and changing a position of the displacement sensor or the displacement sensor to be used in accordance with a change of a movement direction of the observation region.

According to the observation device, the observation method, and the observation device control program of the present invention, at least one of the container or the imaging optical system forming the image of the observation target in the container is moved in the horizontal plane. In this way, by moving the observation region of the imaging optical system by moving the container or the imaging optical system in the horizontal plane, a scanning time of the observation region can be shortened compared to the scanning time in a case where the observation region is moved by moving the container in only one direction as in JP2011-081211A.

Further, in the first observation device, the first observation method, and the first observation device control program of the present invention, an auto-focus control is performed by detecting the vertical position of the container at the forward position of the observation region in the movement direction with reference to the position of the observation region of the imaging optical system with respect to the container using at least one displacement sensor, and performing at least one of the first operation of changing the focal length of the imaging optical system, the second operation of moving the imaging lens in the optical axis direction, the third operation of moving the imaging element in the optical axis direction, or the fourth operation of moving the container in the optical axis direction based on the detected vertical position of the container. In the second observation device, the second observation method, and the second observation device control program of the present invention, the auto-focus control is performed by detecting the vertical position of the container at the forward position of the observation region in the movement direction with reference to the position of the observation region of the imaging optical system with respect to the container using at least one displacement sensor, and performing at least one of the first operation of changing the focal length of the imaging optical system, the second operation of moving the imaging lens in the optical axis direction, or the fourth operation of moving the container in the optical axis direction based on the detected vertical position of the container. Thus, the auto-focus control can be performed at a higher speed than the auto-focus control performed based on contrast of the captured image as in JP2011-081211A.

Further, in the present invention, the position of the displacement sensor or the displacement sensor to be used is changed in accordance with the change of the movement direction of the observation region. Thus, the position of the container can always be detected prior to the capturing of the image.

DESCRIPTION OF THE PREFERRED EMBODIMENTS

Figure 1:
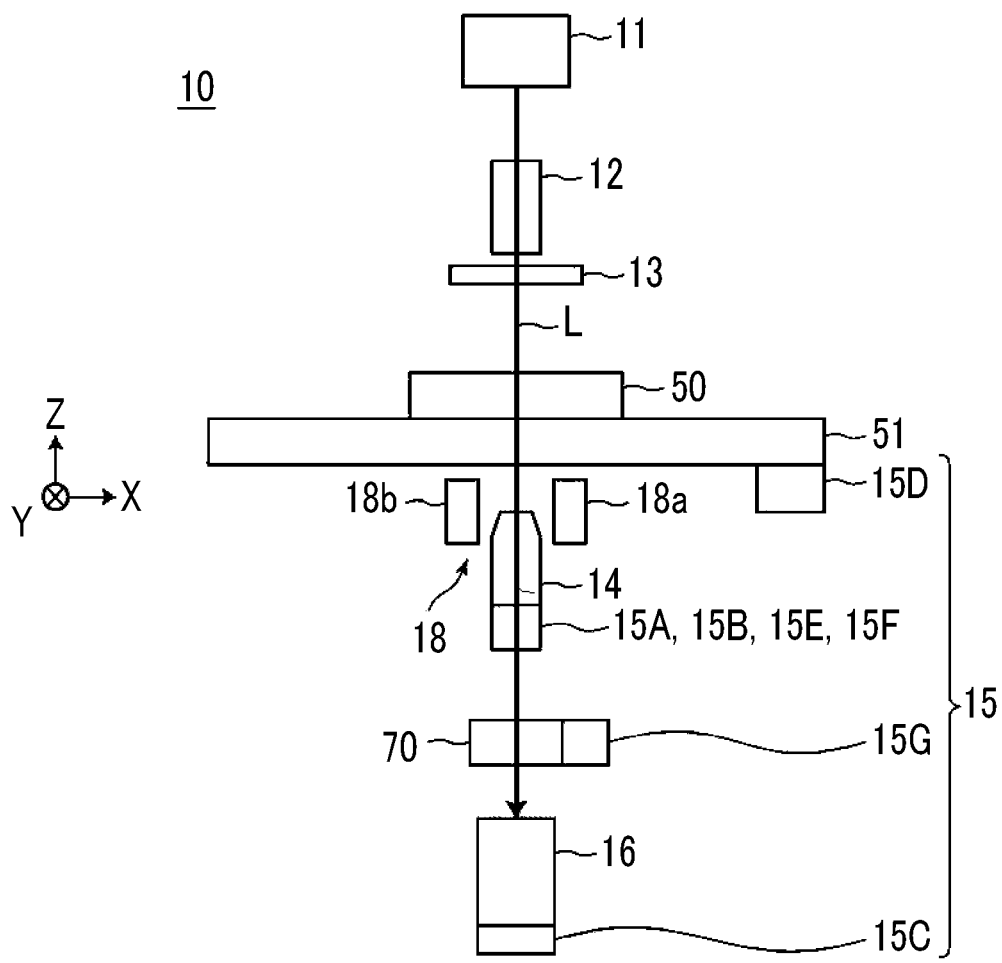
FIG. 1 is a diagram showing a schematic configuration of a microscope observation system that uses an observation device according to a first embodiment of the present invention.

Hereinafter, a microscope observation system that uses an observation device, an observation method, and an observation device control program according to a first embodiment of the present invention will be described with reference to the accompanying drawing. FIG. 1 is a block diagram showing a schematic configuration of a microscope device 10 in a microscope observation system of the embodiment.

The microscope device 10 captures a phase difference image of a cultivated cell that is an observation target. Specifically, as shown in FIG. 1, the microscope device 10 includes a white light source 11 emitting white light, a condenser lens 12, a slit plate 13, an imaging optical system 14, an operating section 15, an imaging element 16, and a detection section 18. In addition, the microscope device 10 includes a focal length changing optical system 70.

The operating section 15 includes a first operating section 15A, a second operating section 15B, a third operating section 15C, a fourth operating section 15D, a fifth operating section 15E, a sixth operating section 15F, and a seventh operating section 15G. The operation of the first to seventh operating sections 15A to 15G will be described later.

A slit of a ring shape through which white light is transmitted unlike a light screen blocking white light emitted from the white light source 11 is provided in the slit plate 13. Illumination light L of a ring shape is formed by causing white light to pass through the slit.

Figure 2:
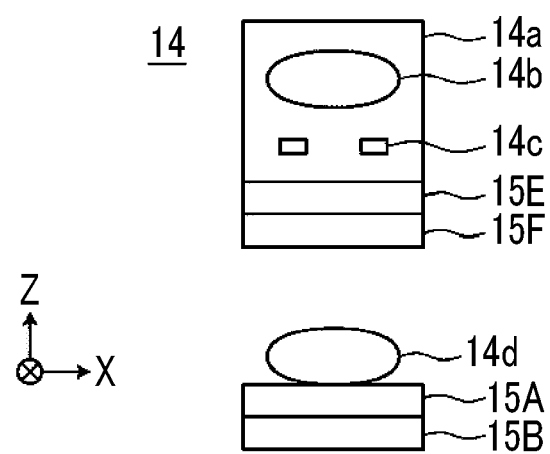
FIG. 2 is a schematic diagram showing a configuration of an imaging optical system.

FIG. 2 is a diagram showing a detailed configuration of the imaging optical system 14. The imaging optical system 14 includes a phase difference lens 14a and an imaging lens 14d, as shown in FIG. 2. The phase difference lens 14a includes an objective lens 14b and a phase plate 14c. The phase plate 14c has a configuration in which a phase ring is formed in a transparent plate that is transparent with respect to a wavelength of the illumination light L. The size of the slit of the above-described slit plate 13 is in a cooperative relation with the phase ring of the phase plate 14c.

The phase ring has a configuration in which a phase membrane that shifts a phase of incident light by ¼ of a wavelength and a light-reducing filter that reduces incident light are formed in a ring shape. The phase of direct light incident onto the phase ring shifts by ¼ of a wavelength after passing through the phase ring, and its brightness is weakened. On the other hand, most of diffracted light diffracted by an observation target passes through the transparent plate of the phase plate 14c, and its phase and brightness are not changed.

The phase difference lens 14a including the objective lens 14b is moved in an optical axis direction of the objective lens 14b by the fifth operating section 15E of the operating section 15 shown in FIG. 1. In this embodiment, the objective lens 14b, the optical axis direction, and a Z direction (vertical direction) are the same direction. An auto-focus control is performed as the objective lens 14b is moved in the Z direction, and contrast of a phase difference image captured by the imaging element 16 is adjusted.

Further, a configuration in which a magnification of the phase difference lens 14a is changeable may be used. Specifically, a configuration in which the phase difference lenses 14a or the imaging optical systems 14 having different magnifications are interchangeable may be used. The interchange between the phase difference lens 14a and the imaging optical systems 14 may be automatically performed, or may be manually performed by a user.

The objective lens 14b consists of a liquid lens having a changeable focal length. The objective lens 14b is not limited to the liquid lens as long as the focal length can be changed. Any lens such as a liquid crystal lens and a shape changing lens can be used. The focal length of the objective lens 14b is changed by changing an applied voltage by the sixth operating section 15F in the operating section 15 shown in FIG. 1. Accordingly, a focal length of the imaging optical system 14 is changed. An auto-focus control is performed as the focal length of the objective lens 14b is changed, and contrast of a phase difference image captured by the imaging element 16 is adjusted.

The phase difference image passing through the phase difference lens 14a is incident on the imaging lens 14d and is formed on the imaging element 16. In this embodiment, the imaging lens 14d consists of a liquid lens having a changeable focal length. The imaging lens 14d is not limited to the liquid lens as long as the focal length can be changed. Any lens such as a liquid crystal lens and a shape changing lens can be used. The focal length of the imaging lens 14d is changed by changing an applied voltage by the first operating section 15A in the operating section 15 shown in FIG. 1. Accordingly, the focal length of the imaging optical system 14 is changed. An auto-focus control is performed as the focal length of the imaging lens 14d is changed in the Z direction, and contrast of a phase difference image captured by the imaging element 16 is adjusted.

The imaging lens 14d is moved in an optical axis direction of the imaging lens 14d by the second operating section 15B in the operating section 15 shown in FIG. 1. In this embodiment, the imaging lens 14d, the optical axis direction, and a Z direction (vertical direction) are the same direction. An auto-focus control is performed as the imaging lens 14d is moved in the Z direction, and contrast of a phase difference image captured by the imaging element 16 is adjusted.

The imaging element 16 captures an image on the basis of the phase difference image formed by the imaging lens 14d. As the imaging element 16, a charge-coupled device (CCD) image sensor, a complementary metal-oxide semiconductor (CMOS) image sensor, or the like may be used. As the imaging element, an imaging element in which color filters of red, green, and blue (R, G, and B) are provided may be used, or a monochromic imaging element may be used.

The imaging element 16 is moved in the Z direction by the third operating section 15C in the operating section 15 shown in FIG. 1. In this embodiment, a direction perpendicular to an imaging surface of the imaging element 16 and the Z direction are the same directions. An auto-focus control is performed as the imaging element 16 is moved in the Z direction, and contrast of a phase difference image captured by the imaging element 16 is adjusted.

The detection section 18 detects a Z-directional (vertical) position of a cultivation container 50 provided on a stage 51. Specifically, the detection section 18 includes a first displacement sensor 18a and a second displacement sensor 18b. The first displacement sensor 18a and the second displacement sensor 18b are provided in parallel in the X direction shown in FIG. 1 with the phase difference lens 14a being interposed therebetween. The first displacement sensor 18a and the second displacement sensor 18b in this embodiment are laser displacement meters, which irradiate the cultivation container 50 with laser light and detect its reflection light to detect a Z-directional position of a bottom surface of the cultivation container 50. The bottom surface of the cultivation container 50 refers to a boundary surface between a bottom portion of the cultivation container 50 and cells that are observation targets, that is, a surface on which the observation targets are placed.

Z-directional positional information of the cultivation container 50 detected by the detection section 18 is output to the operation controller 21. The operation controller 21 controls the operating section 15 based on the input positional information and performs the auto-focus control. The detection of the position of the cultivation container 50 based on the first displacement sensor 18a and the second displacement sensor 18b and the auto-focus control in the operation controller 21 will be described later.

Between the slit plate 13, and the phase difference lens 14a and the detection section 18, the stage 51 is provided. On the stage 51, the cultivation container 50 in which cells that are observation targets are contained is provided.

The cultivation container 50 corresponds to a container according to the embodiment of the present invention. As the cultivation container 50, a scahle, a dish, a flask, a well plate, or the like may be used. Besides, a microscope slide, a microchannel device in which a minute channel is formed, and the like can be used as the container. Further, as cells contained in the cultivation container 50, multipotential stem cells such as induced pluripotent stem (iPS) cells and embryonic stem (ES) cells, cells of nerves, the skin, the myocardium and the liver, which are differentiated and induced from a stem cell, cells of the skin, the retina, the myocardium, blood corpuscles, nerves, and organs extracted from a human body, and the like, may be used.

The stage 51 is moved in the X direction and a Y direction that are orthogonal to each other by the horizontal driving section 17 (see FIG. 5) (which will be described later). The X direction and the Y direction are directions orthogonal to the Z direction, and are directions that are orthogonal to each other in a horizontal plane. In this embodiment, the X direction is referred to as a main scanning direction, and the Y direction is referred to as a sub-scanning direction.

Figure 3:
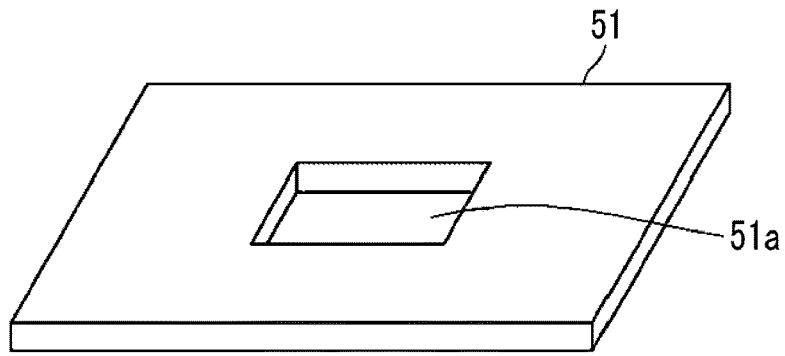
FIG. 3 is a perspective view showing a configuration of a stage.

FIG. 3 is a diagram showing an example of the stage 51. At the center of the stage 51, a rectangular opening 51a is formed. The cultivation container 50 is provided on a member forming the opening 51a. Light transmitted through the cells in the cultivation container 50 and light diffracted by the cells are configured to pass through the opening 51a.

The stage 51 is moved in the Z direction by the fourth operating section 15D. Accordingly, the cultivation container 50 is moved in the Z direction. The fourth operating section 15D includes an actuator such as a piezoelectric element. In this embodiment, a direction perpendicular to a surface on which the cultivation container 50 is provided in the stage 51, and the Z direction are the same directions. An auto-focus control is performed as the stage 51 is moved in the Z direction, and contrast of a phase difference image captured by the imaging element 16 is adjusted.

For example, the first operating section 15A and the sixth operating section 15F include a voltage changeable circuit. The first operating section 15A changes the voltage applied to the imaging lens 14d based on a control signal output from the operation controller 21 described later. The sixth operating section 15F changes the voltage applied to the objective lens 14b based on the control signal output from the operation controller 21 described later.

The second operating section 15B, the third operating section 15C, the fourth operating section 15D, and the fifth operating section 15E include an actuator such as a piezoelectric element and are driven based on the control signal output from the operation controller 21 described later. The operating section 15 is configured to pass a phase difference image passed through the phase difference lens 14a and the imaging lens 14d as it is. The configurations of the second operating section 15B, the third operating section 15C, the fourth operating section 15D, and the fifth operating section 15E are not limited to the piezoelectric element. Other well-known configurations can be used as long as the imaging lens 14d, the imaging element 16, the stage 51, and the objective lens 14b (phase difference lens 14a) can be moved in the Z direction.

Figure 4:
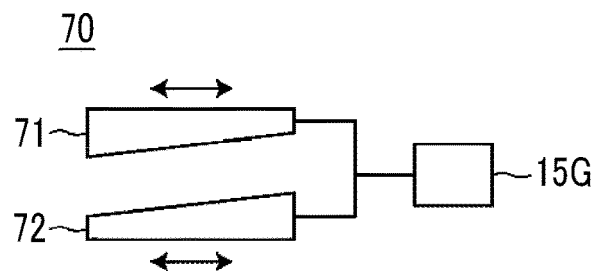
FIG. 4 is a schematic diagram showing a configuration of a focal length changing optical system.

FIG. 4 is a schematic diagram showing a configuration of the focal length changing optical system 70. As shown in FIG. 4, the focal length changing optical system 70 includes a first wedge prism 71 of a circular shape and a second wedge prism 72 of a circular shape. The seventh operating section 15G moves the first wedge prism 71 and the second wedge prism 72 in the opposite directions in synchronization with each other. Accordingly, the focal position of the imaging optical system 14 is changed. Changing the focal position means increasing or decreasing the focal length. Thus, by changing the focal position of the imaging optical system 14, the focal length of the imaging optical system 14 is changed. In this embodiment, the changing of the focal length of the imaging optical system 14 includes not only changing of the focal length of the imaging lens 14d by the first operating section 15A and changing of the focal length of the objective lens 14b by the sixth operating section 15F but also changing of the focal length of the imaging optical system 14 by changing the focal position of the imaging optical system 14 by the seventh operating section 15G.

The first and second wedge prisms 71 and 72 are prisms in which two surfaces that may be an incidence surface and an emission surface of light are not parallel, that is, one surface is inclined with respect to the other surface. In the following description, a surface arranged to be perpendicular to the optical axis will be referred to as a right angle surface, and a surface arranged to be inclined with respect to the optical axis will be referred to as a wedge surface. The first and second wedge prisms 71 and 72 are prisms that deflect light perpendicularly incident on the right angle surface. The seventh operating section 15G includes an actuator such as a piezoelectric element. Based on the control signal output from the operation controller 21 described later, the seventh operating section 15G moves the first wedge prism 71 and the second wedge prism 72 in the opposite directions in synchronization with each other while maintaining the right angle surfaces in parallel. That is, in a case where the first wedge prism 71 is moved in a rightward direction in FIG. 4, the second wedge prism 72 is moved in a leftward direction. Conversely, in a case where the first wedge prism 71 is moved in the leftward direction in FIG. 4, the second wedge prism 72 is moved in the rightward direction. In this way, by moving the first and second wedge prisms 71 and 72, an optical path length of light emitted from the imaging optical system 14 is changed. Accordingly, the focal length can be changed by changing the focal position of the imaging optical system 14. Accordingly, the auto-focus control is performed, and the contrast of the phase difference image captured by the imaging element 16 is adjusted.

Figure 5:
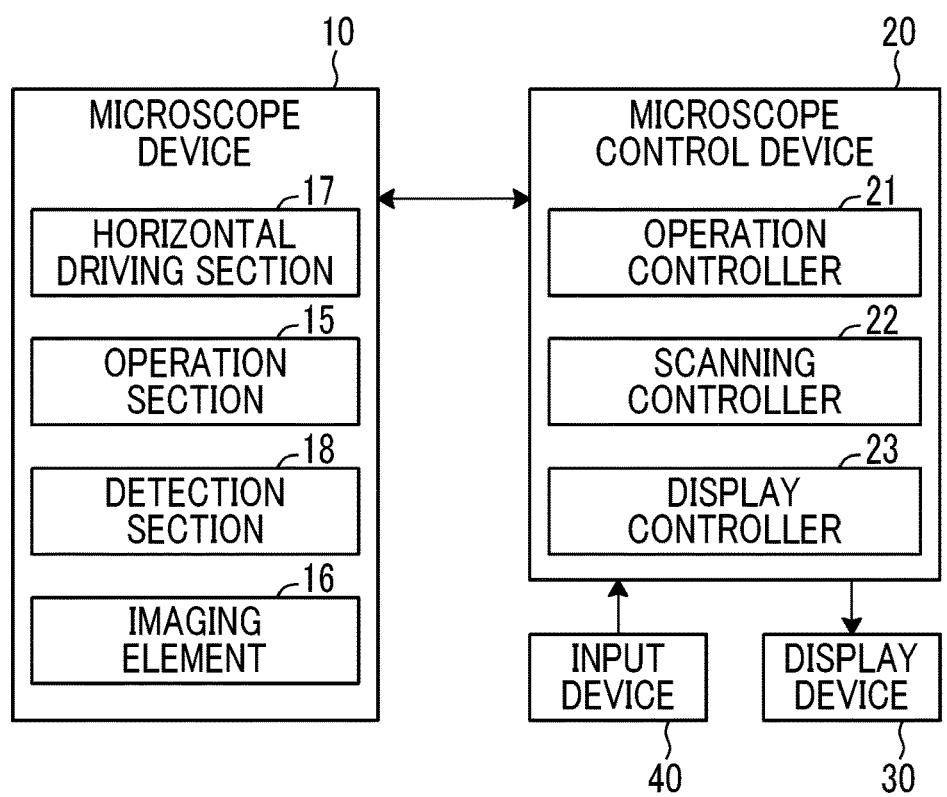
FIG. 5 is a block diagram showing a schematic configuration of a microscope observation system that uses an observation device according to a first embodiment of the present invention.

Then, a configuration of the microscope control device 20 that controls the microscope device 10 will be described. FIG. 5 is a block diagram showing a configuration of a microscope observation system according to this embodiment. With respect to the microscope device 10, a block diagram of a partial configuration controlled by respective sections of the microscope control device 20 is shown.

The microscope control device 20 generally controls the microscope device 10, and particularly, includes the operation controller 21, a scanning controller 22, and a display controller 23.

The microscope control device 20 is configured of a computer including a central processing unit, a semiconductor memory, a hard disk, and the like. An embodiment of an observation device control program of the present invention is installed in the hard disk. Further, as the observation device control program is executed by the central processing unit, the operation controller 21, the scanning controller 22, and the display controller 23 shown in FIG. 5 execute functions.

The operation controller 21 performs the auto-focus control by operating the operating section 15 based on the Z-directional positional information of the cultivation container 50 detected by the detection section 18 as described above. Specifically, the control signal is output to each of the first operating section 15A to the seventh operating section 15G based on the positional information. Accordingly, the focal length of the imaging lens 14d is changed by the first operating section 15A, and the focal length of the imaging optical system 14 is changed. The imaging lens 14d is moved in the optical axis direction by the second operating section 15B. The imaging element 16 is moved in the optical axis direction by the third operating section 15C. The stage 51 is moved in the optical axis direction by the fourth operating section 15D. The objective lens 14b is moved in the optical axis direction by the fifth operating section 15E. By changing the focal length of the objective lens 14b by the sixth operating section 15F, the focal length of the imaging optical system 14 is changed. Further, by changing the focal position of the imaging optical system 14 by the seventh operating section 15G, the focal length of the imaging optical system 14 is changed. By performing the seven operations, the auto-focus control is performed.

The changing of the focal length of the imaging lens 14d by the first operating section 15A, the changing of the focal length of the objective lens 14b by the sixth operating section 15F, and the changing of the focal length of the focal length changing optical system 70 by the seventh operating section 15G correspond to a first operation. The movement of the imaging lens 14d in the optical axis direction by the second operating section 15B corresponds to a second operation. The movement of the imaging element 16 in the optical axis direction by the third operating section 15C corresponds to a third operation. The movement of the stage 51 in the optical axis direction by the fourth operating section 15D corresponds to a fourth operation. The movement of the objective lens 14b in the optical axis direction by the fifth operating section 15E corresponds to a fifth operation.

The scanning controller 22 controls driving of the horizontal driving section 17. Accordingly, the stage 51 is moved in the X direction and the Y direction, and the cultivation container 50 is moved in the X direction and the Y direction. The horizontal driving section 17 is configured of an actuator having a piezoelectric element, or the like.

Hereinafter, the movement control of the stage 51 by the scanning controller 22 and the auto-focus control by the operation controller 21 will be described in detail.

Figure 6:
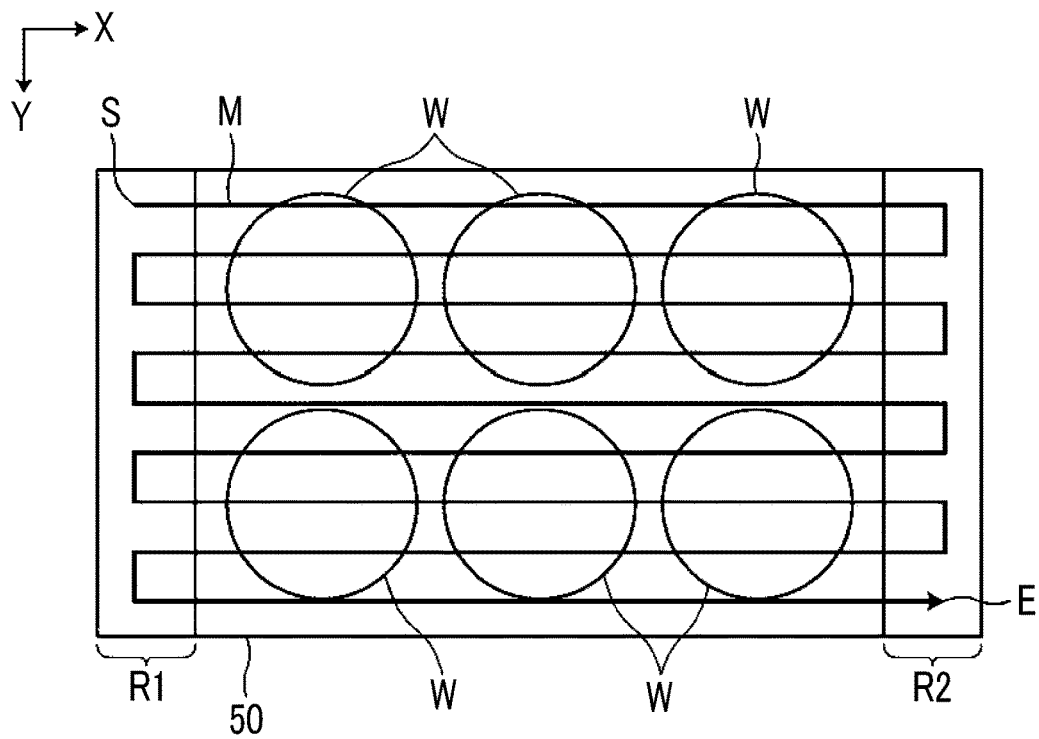
FIG. 6 is a diagram showing a scanning position of an observation region in a cultivation container.

In this embodiment, the stage 51 is moved in the X direction and the Y direction by the control of the main scanning controller 22, an observation region of the imaging optical system 14 is moved in the cultivation container 50 in a two-dimensional form, and the cultivation container 50 is scanned, and then a phase difference image in each observation region is captured. FIG. 6 is a diagram showing a scanning position of an observation region in the cultivation container 50 using a solid line M. In this embodiment, a well plate having six wells W is used as the cultivation container 50.

As shown in FIG. 6, the observation region of the imaging optical system 14 is moved from a scanning start point S to a scanning end point E along the solid line M. That is, the observation region is moved in a positive direction (a rightward direction in FIG. 6) of the X direction, is moved in the Y direction (a lower direction in FIG. 6), and then, is moved in a reverse negative direction (in a left direction in FIG. 6). Then, the observation region is moved in the Y direction again, and then, is moved in the positive direction again. In this way, by repeating the reciprocation in the X direction and the movement in the Y direction of the observation region, the cultivation container 50 is scanned in a two-dimensional form.

Figure 7:
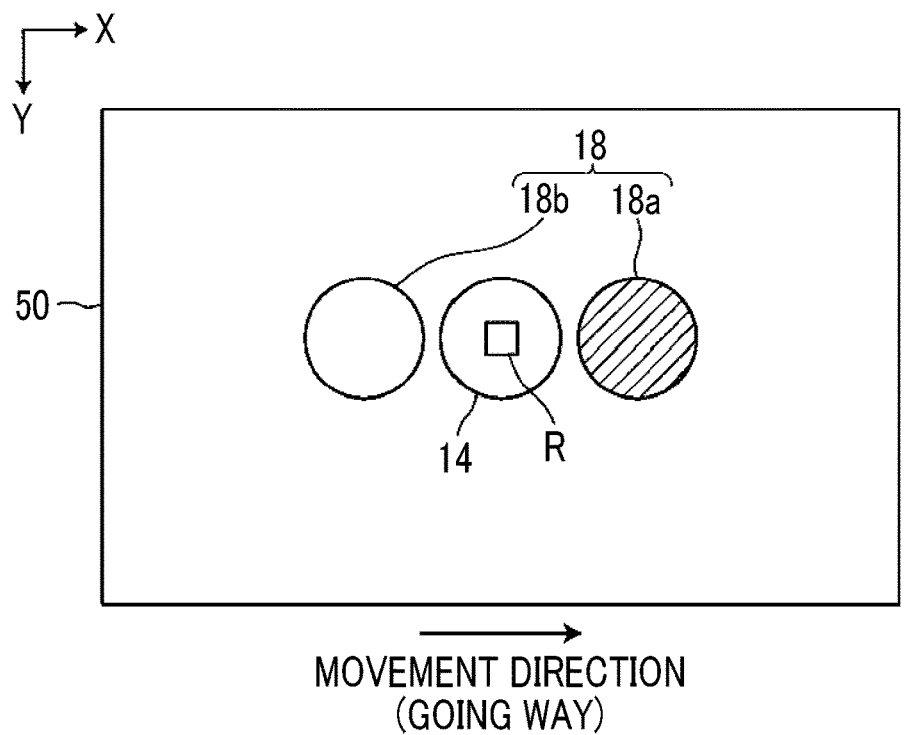
FIG. 7 is a diagram showing a positional relationship between an imaging optical system, a first displacement sensor and a second displacement sensor, and the cultivation container in a case where an observation region is disposed at a predetermined position in the cultivation container.
Figure 8:
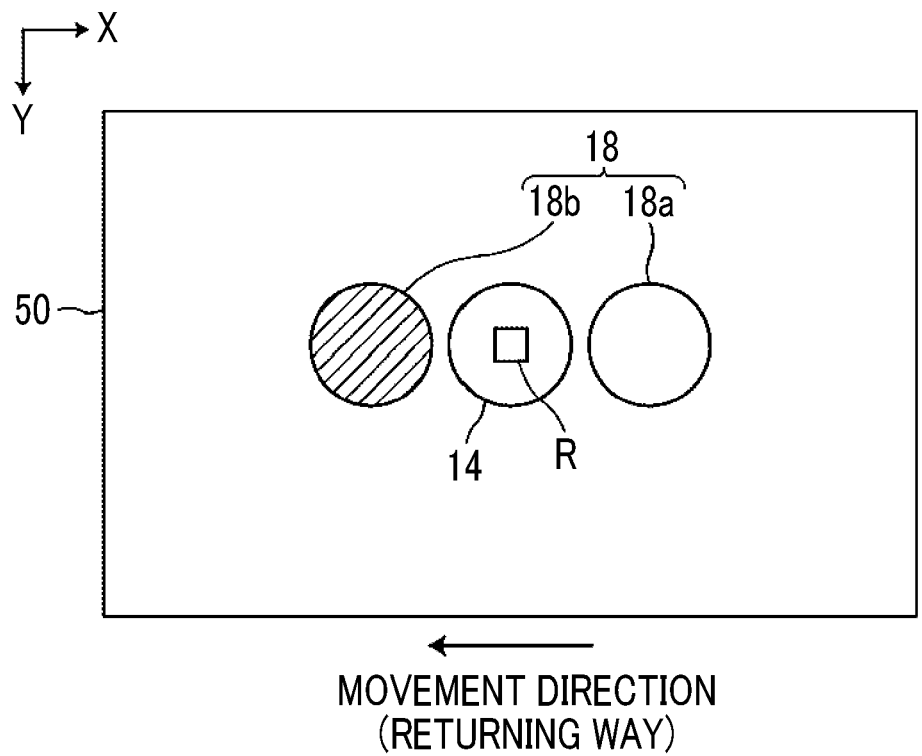
FIG. 8 is a diagram illustrating switching between the first displacement sensor and the second displacement sensor.

FIGS. 7 and 8 are diagrams showing a positional relationship between the imaging optical system 14, the first displacement sensor 18a and the second displacement sensor 18b, and the cultivation container 50 in a case where an observation region R is disposed at a predetermined position in the cultivation container 50.

In this embodiment, as shown in FIGS. 7 and 8, the first displacement sensor 18a and the second displacement sensor 18b are provided in parallel in the X direction with the imaging optical system 14 being interposed therebetween. Further, the observation region R of the imaging optical system 14 is moved in the cultivation container 50 in a two-dimensional form as described above. Here, a Z-directional position of the cultivation container 50 is detected at a forward position of the observation region R in a movement direction with reference to the position of the observation region R of the imaging optical system 14 with respect to the cultivation container 50. Specifically, in a case where the observation region R is moved in an arrow direction shown in FIG. 7 (a rightward direction in FIG. 7), the Z-directional position of the cultivation container 50 is detected by the first displacement sensor 18a disposed on a forward side in the movement direction of the observation region R among the first displacement sensor 18a and the second displacement sensor 18b. Further, in a case where the observation region R is moved to the position where the Z-directional position of the cultivation container 50 is detected by the first displacement sensor 18a from the position shown in FIG. 7, an auto-focus control is performed using Z-directional positional information of the cultivation container 50 that is previously detected, and capturing of a phase difference image is performed.

On the other hand, in a case where the observation region R is moved in an arrow direction in FIG. 8 (a leftward direction in FIG. 8), the Z-directional position of the cultivation container 50 is detected by the second displacement sensor 18b disposed on a forward side in the movement direction of the observation region R among the first displacement sensor 18a and the second displacement sensor 18b. Further, in a case where the observation region R is moved to the position where the Z-directional position of the cultivation container 50 is detected by the second displacement sensor 18b from the position shown in FIG. 8, an auto-focus control is performed using the Z-directional positional information of the cultivation container 50 that is previously detected, and capturing of a phase difference image is performed.

In this way, by performing switching between the detection of the cultivation container 50 using the first displacement sensor 18a and the detection of the cultivation container 50 using the second displacement sensor 18b in accordance with the movement direction of the observation regions R, it is possible to acquire Z-directional positional information of the cultivation container 50 at the position of the observation region R, prior to capturing of a phase difference image of the observation regions R.

Further, the operation controller 21 controls driving of the operating section 15 on the basis of the Z-directional positional information of the cultivation container 50 that is previously detected as described above to perform an auto-focus control. Specifically, in the operation controller 21, a relationship among the Z-directional positional information of the cultivation container 50, the applied voltage of the imaging lens 14d for changing the focal length of the imaging lens 14d, a movement amount of the imaging lens 14d in the optical axis direction, a movement amount of the imaging element 16 in the optical axis direction, a movement amount of the stage 51 in the optical axis direction, a movement amount of the objective lens 14b in the optical axis direction, the applied voltage of the objective lens 14b for changing the focal length of the objective lens 14b, and a movement amount of the focal length changing optical system 70 is stored in advance as a table. This table will be referred to as a first table.

Based on the input Z-directional positional information of the cultivation container 50, the operation controller 21 refers to the first table and obtains each of the applied voltage of the imaging lens 14d for changing the focal length of the imaging lens 14d, the movement amount of the imaging lens 14d in the optical axis direction, the movement amount of the imaging element 16 in the optical axis direction, the movement amount of the stage 51 in the optical axis direction, the movement amount of the objective lens 14b in the optical axis direction, the applied voltage of the objective lens 14b for changing the focal length of the objective lens 14b, and the movement amount of the focal length changing optical system 70. In the following description, the applied voltage of the imaging lens 14d for changing the focal length of the imaging lens 14d, the movement amount of the imaging lens 14d in the optical axis direction, the movement amount of the imaging element 16 in the optical axis direction, the movement amount of the stage 51 in the optical axis direction, the movement amount of the objective lens 14b in the optical axis direction, the applied voltage of the objective lens 14b for changing the focal length of the objective lens 14b, and the movement amount of the focal length changing optical system 70 will be referred to as a focus control amount.

In order to control the operating section 15, the operation controller 21 outputs a control signal corresponding to the focus control amount to the first operating section 15A to the seventh operating section 15G. Specifically, by referring to the first table based on positional information of the stage 51, the focus control amount is acquired and is output to the first operating section 15A to the seventh operating section 15G.

The operating section 15, that is, the first operating section 15A to the seventh operating section 15G, is driven based on the input control signal. Accordingly, a focus control corresponding to the Z-directional position of the cultivation container 50 is performed.

In this embodiment, since the Z-directional position of the cultivation container 50 is previously detected with respect to each observation region R as described above, a detection timing of the position of the cultivation container 50 with respect to each observation region R and an imaging timing of each phase difference image temporally shift. Accordingly, the auto-focus control is performed after the detection of the position of the cultivation container 50 is performed by the first displacement sensor 18a or the second displacement sensor 18b and before the observation region R reaches the detected position.

Here, in a case where the timing of the auto-focus control is too early, there is a possibility that the Z-directional position of the cultivation container 50 shifts due to some causes after the auto-focus control and before the observation region R reaches the detected position, which may lead to shift in the focus position.

Figure 9:
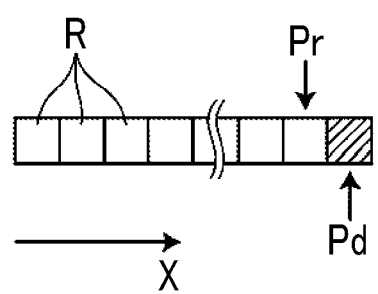
FIG. 9 is a diagram illustrating an example of a timing of an auto-focus control.

Accordingly, it is preferable that the timing of the auto-focus control is a timing immediately before the observation region R reaches the detected position and a timing when capturing of a phase difference image at the detected position is enough. Here, it is preferable that the timing immediately before the observation region R reaches the detected position is a time, for example, as shown in FIG. 9, in a case where the observation region R is sequentially moved in the X direction and the position detected by the detection section 18 is a position pd indicated by oblique lines, from a time point when the observation region R passes a position Pr of the observation region R contiguous to the detected position Pd to a time point when the observation region R reaches the detected position Pd. The auto-focus control may be performed at the time point when the observation region R reaches the detected position Pd.

In this embodiment, a time from a detection timing by the first displacement sensor 18a or the second displacement sensor 18b to a timing of an auto-focus control using positional information on a corresponding detected position is predetermined so that the timing of the auto-focus control becomes the above-described preferable timing.

For example, in a case where a moving velocity of the stage 51 is changed by a change of magnification of the phase difference lens 14a, or the like, for example, the predetermined time may be changed in accordance with the change of the moving velocity of the stage 51. Alternatively, instead of changing the time, in a case where the moving velocity of the stage 51 is changed, a distance between the first displacement sensor 18a or the second displacement sensor 18b and the imaging optical system 14 may be changed by moving the first displacement sensor 18a or the second displacement sensor 18b in the X direction.

Further, as in this embodiment, in a case where the first displacement sensor 18a and the second displacement sensor 18b are provided in parallel in the X direction with the imaging optical system 14 being interposed therebetween and the position of the cultivation container 50 is detected prior to capturing of a phase difference image, in order to detect the position of the cultivation container 50 and capture the phase difference image in an entire region of the range of the cultivation container 50, as shown in FIG. 6, it is necessary to relatively move the imaging optical system 14, the first displacement sensor 18a and the second displacement sensor 18b up to outside ranges R1 and R2 with reference to the range of the cultivation container 50 in the X direction. Further, it is necessary to secure at least an interval in the X direction between the first displacement sensor 18a and the imaging optical system 14 as the width of the range R1 in the X direction, and to secure at least an interval in the X direction between the second displacement sensor 18b and the imaging optical system 14 as the width of the range R2 in the X direction. In addition, in order to reduce a movement time of the observation region R as much as possible, it is preferable to narrow a movement range of the observation region R as much as possible. Accordingly, it is preferable that the width of the range R1 in the X direction is set to the interval between the first displacement sensor 18a and the imaging optical system 14 in the X direction, and it is preferable that the width of the range R2 in the X direction is set to the interval between the second displacement sensor 18b and the imaging optical system 14 in the X direction.

On the other hand, in a case where the observation region R is moved in the range of the cultivation container 50 by moving the stage 51 in the X direction, it is preferable that the moving velocity of the observation region R in the range of the cultivation container 50 is uniform. Accordingly, at a time when the movement of the stage 51 in the X direction starts, it is necessary to accelerate the stage 51 to reach a uniform velocity, and at a time when the movement of the stage 51 in the X direction ends, it is necessary to decelerate the stage 51 from the uniform velocity for stopping.

Further, in a case where the moving velocity of the stage 51 in the X direction is to be the uniform velocity, it is possible to rapidly control the moving velocity to the uniform velocity without nearly giving an acceleration region, but in a case where such a control is performed, a liquid level of a culture medium or the like contained in the cultivation container 50 together with cells shakes, which may cause lowering in image quality of a phase difference image. In addition, in a case where the stage 51 is stopped, the same problem may occur.

Accordingly, in this embodiment, the range R1 and the range R2 shown in FIG. 6 are set to acceleration/deceleration regions of the movement of the stage 51 in the X direction. By setting the acceleration/deceleration regions on both sides of the range of the cultivation container 50 in the X direction in this way, it is possible to move the observation region R at a uniform velocity in the range of the cultivation container 50, without uselessly enlarging a scanning range of observation region R. Further, it is possible to prevent the above-mentioned shake of the liquid level of the culture medium.

Next, returning to FIG. 5, the display controller 23 combines phase difference images of the respective observation regions R imaged by the microscope device 10 to generate one synthetic phase difference image, and displays the synthetic phase difference image on the display device 30.

The display device 30 displays the synthetic phase difference image generated by the display controller 23 as described above. For example, the display device 30 includes a liquid crystal display, or the like. Further, the display device 30 may be formed by a touch panel, and may also be used as the input device 40.

The input device 40 includes a mouse, a keyboard, or the like, and receives various setting inputs from a user. The input device 40 according to this embodiment receives a setting input such as a change command of the magnification of the phase difference lens 14a or a change command of the moving velocity of the stage 51, for example.

Figure 10:
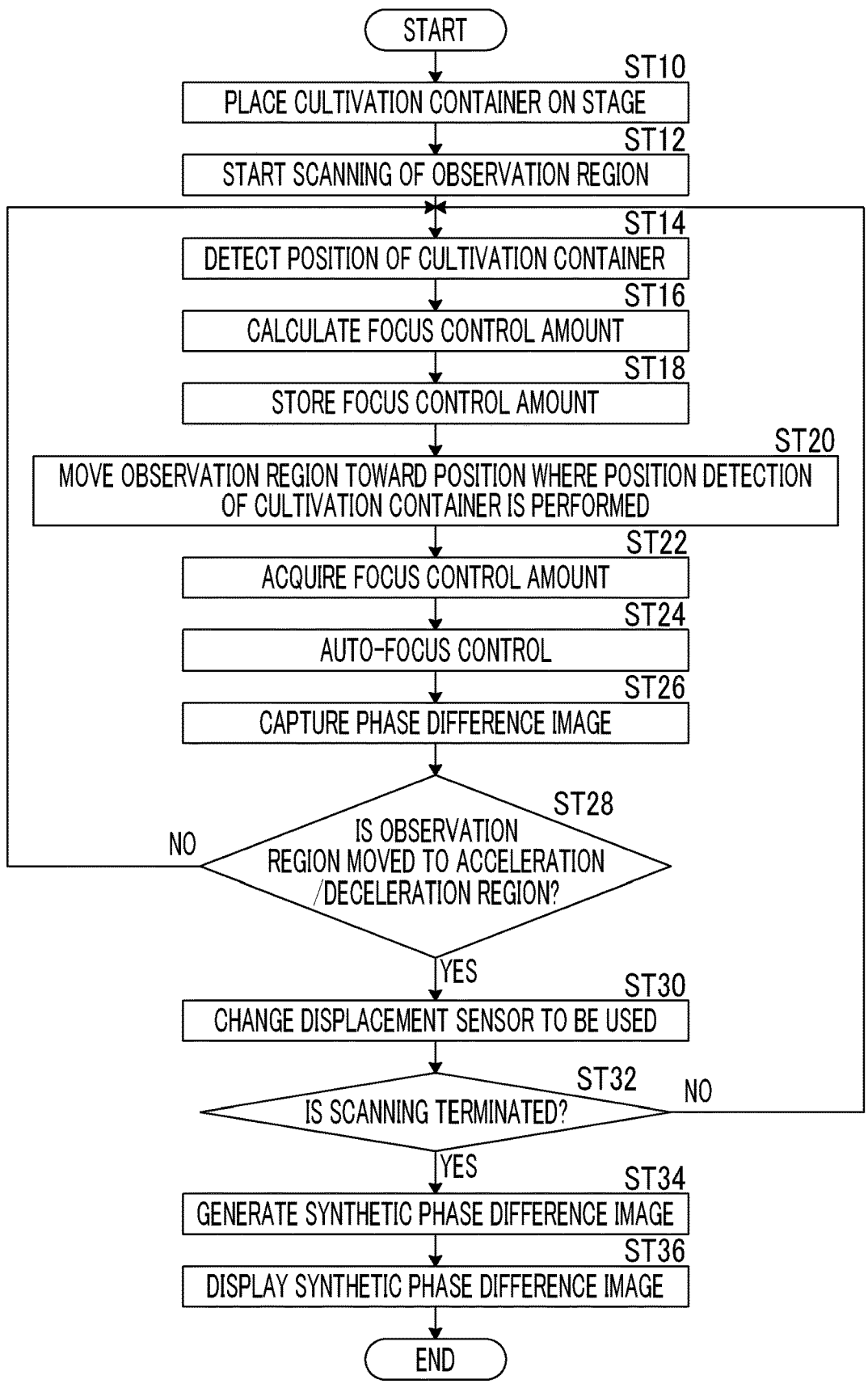
FIG. 10 is a flowchart illustrating an operation of the microscope observation system that uses the observation device according to the first embodiment of the present invention.

Next, an operation of the microscope observation system according to this embodiment will be described with reference to a flowchart shown in FIG. 10. First, the cultivation container 50 in which cells that are observation targets are contained is provided on the stage 51 (step ST10). Then, the stage 51 is moved so that the observation region R of the imaging optical system 14 is set at the position of the scanning start point S shown in FIG. 6, and scanning of the observation region R is started (step ST12).

Here, in this embodiment, as described above, position detection of the cultivation container 50 is precedently performed with respect to each observation region R, and at a time point when the observation region R reaches the detected position, imaging of a phase difference image is performed. The position detection of the cultivation container 50 and the capturing of the phase difference image are performed while moving the observation region R, and capturing of a phase difference image in the observation region R at a certain position and position detection of the cultivation container 50 at a forward position in a movement direction with reference to the position are performed in parallel.

Specifically, in a case where the observation region R is moved in the arrow direction in FIG. 7, the Z-directional position of the cultivation container 50 is detected by the first displacement sensor 18a (step ST14), and the detected positional information is acquired by the operation controller 21. The operation controller 21 calculates the focus control amount based on the acquired Z-directional positional information of the cultivation container 50 (step ST16) and stores the focus control amount in association with an X-Y coordinate position of the detected position of the cultivation container 50 (step ST18).

Then, the observation region R is moved toward the position where the position detection of the cultivation container 50 is performed by the first displacement sensor 18a in step ST14 (step ST20). The operation controller 21 acquires the focus control amount immediately before the observation region R reaches a position where the position detection of the cultivation container 50 is performed (step ST22), and performs the auto-focus control based on the focus control amount (step ST24). That is, the operation controller 21 controls driving of the operating section 15 based on a movement amount stored in advance, changes the focal length of the imaging lens 14d, and moves the imaging lens 14d, the imaging element 16, and the objective lens 14b in the Z direction. Then, after the auto-focus control, at a time point when the observation region R reaches the position where the position detection of the cultivation container 50 is performed, capturing of a phase difference image is performed (step ST26). The phase difference image of the observation region R is output from the imaging element 16 to the display controller 23 for storage. As described above, while the capturing of the phase difference image of the observation region R is performed in step ST26, the position detection of the cultivation container 50 is performed in parallel at a forward position in the movement direction with reference to the observation region R.

Further, in a case where the observation region R is moved to the range R2 of the acceleration/deceleration regions shown in FIG. 6, is moved in the Y direction, and then, is moved in an opposite direction in the X direction (step ST28; YES), that is, in a case where the movement direction of the observation region R is changed from the arrow direction shown in FIG. 7 to the arrow direction shown in FIG. 8, a displacement sensor to be used is switched from the first displacement sensor 18a to the second displacement sensor 18b (step ST30).

In addition, in a case where the entire scanning is not terminated (step ST32; NO), the observation region R is moved in the X direction again, and the position detection of the cultivation container 50 and the capturing of the phase difference image described above are sequentially performed (step ST14 to step ST30).

A displacement sensor to be used is changed whenever the observation region R is moved up to the acceleration/deceleration region ranges R1 or R2, and the processes of step ST14 to step ST30 are repeatedly performed until the entire scanning is terminated. Further, at a time point when the observation region R reaches the position of the scanning end point E shown in FIG. 6, the entire scanning is terminated (step ST32; YES).

After the entire scanning is terminated, the display controller 23 combines phase difference images of the respective observation regions R to generate a synthetic phase difference image (step ST34), and displays the generated synthetic phase difference image on the display device 30 (step ST36).

In this way, in this embodiment, at least one of the stage 51 on which the cultivation container 50 is provided or the imaging optical system 14 is moved in the main scanning direction and the sub-scanning direction, and the at least one reciprocates in the main scanning direction. Accordingly, a scanning time of the observation region R can be shortened compared to the scanning time in a case where scanning is performed in the observation region R by moving the stage 51 in only one direction as in JP2011-081211A described above.

Further, in this embodiment, a vertical position of the cultivation container 50 at the forward position of the observation region in the movement direction with reference to the position of the observation region of the imaging optical system 14 with respect to the cultivation container 50 is detected using at least one of the displacement sensors 18a and 18b. Based on the detected vertical position of the cultivation container 50, the auto-focus control is performed by the first to seventh operating sections 15A to 15G. Thus, the auto-focus control can be performed at a higher speed than the auto-focus control performed based on the contrast of the captured image as in JP2011-081211A.

Further, in this embodiment, the displacement sensor to be used is changed in accordance with the change of the observation region R in the movement direction. Thus, even in a case where the observation region reciprocates, the position of the cultivation container 50 can always be detected prior to the capturing of the image.

By performing a plurality of operations among the first operation, the second operation, the third operation, and the fourth operation, the auto-focus can be performed at a higher speed than the auto-focus control performed by only one operation.

Further, in this embodiment, the fifth operation of moving the objective lens 14b in the optical axis direction is performed. Thus, the auto-focus can be performed at a higher speed than the auto-focus control performed by only one operation.

Figure 11:
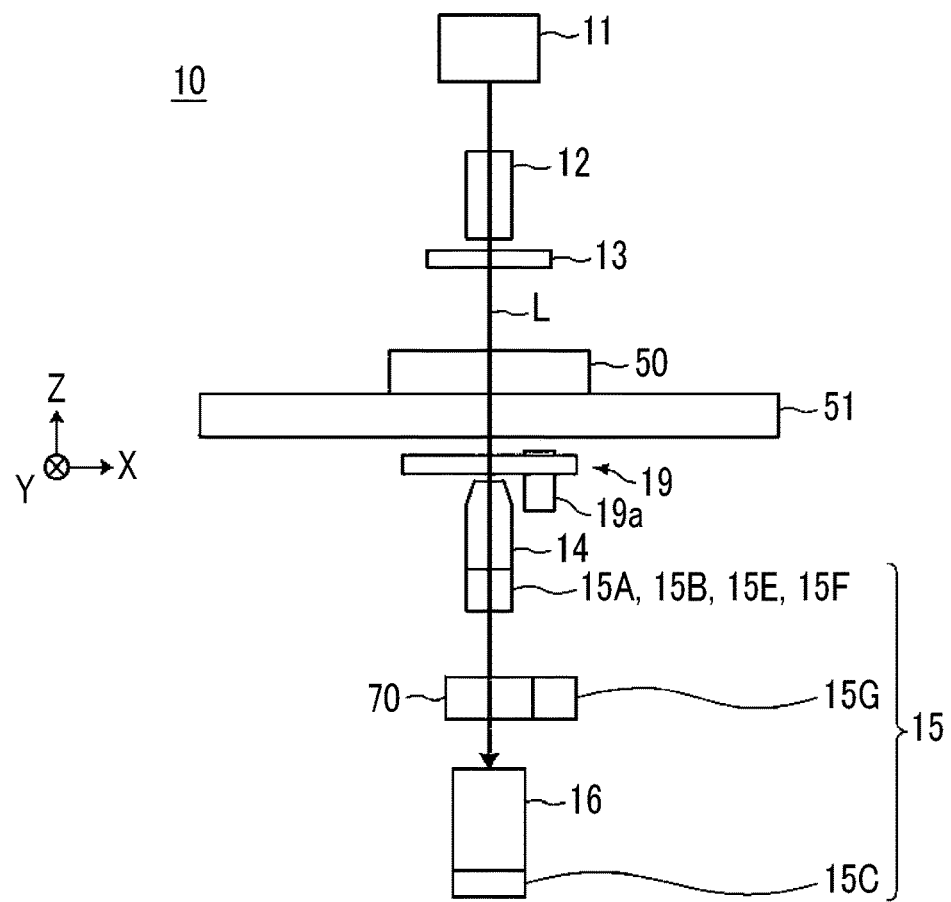
FIG. 11 is a block diagram showing a schematic configuration of a microscope observation system that uses an observation device according to a second embodiment of the present invention.

Next, a microscope observation system using a second embodiment of the present invention will be described in detail with reference to the accompanying drawing. FIG. 11 is a diagram showing a schematic configuration of the microscope observation system according to the second embodiment of the present invention. The microscope observation system of the second embodiment is different from the first microscope observation system of the first embodiment in a configuration of a detection section. Since the microscope observation system of the second embodiment is the same as the first embodiment in the other configurations, hereinafter, the configuration of the detection section of the microscope observation system of the second embodiment will be mainly described.

The detection section 18 of the first embodiment includes two displacement sensors 18a and 18b, in which a displacement sensor 18a and 18b to be used is changed in accordance with a change of a movement direction of the observation region R. On the other hand, a detection section 19 of the second embodiment includes one displacement sensor 19a, in which a position of the displacement sensor 19a is changed in accordance with a change of a movement direction of the observation region R.

Figure 12:
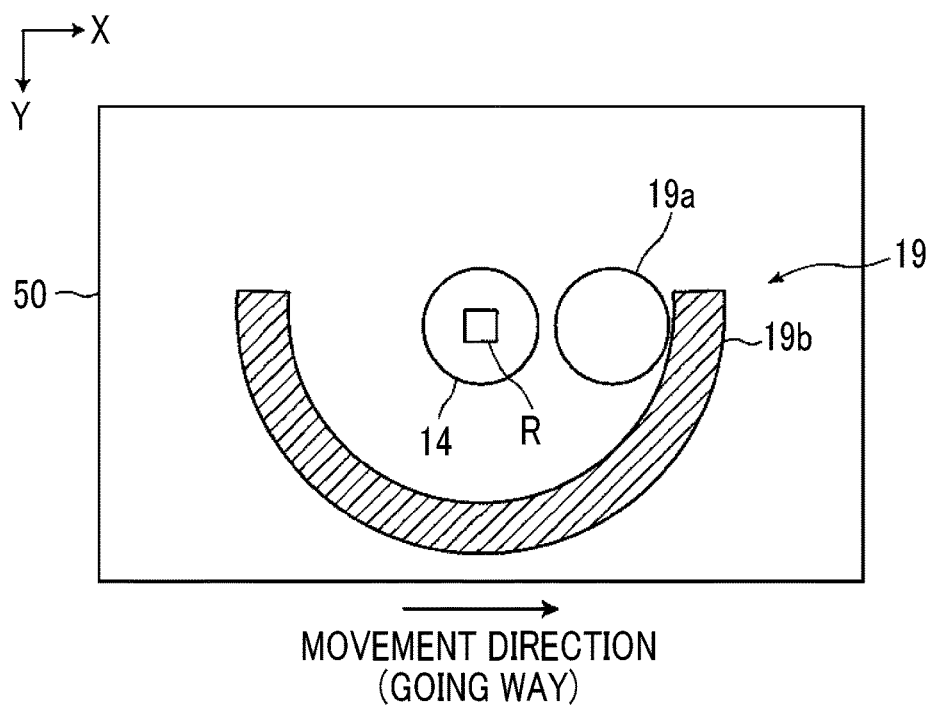
FIG. 12 is a diagram showing a configuration of a detection section of the observation device according to the second embodiment of the present invention.
Figure 13:
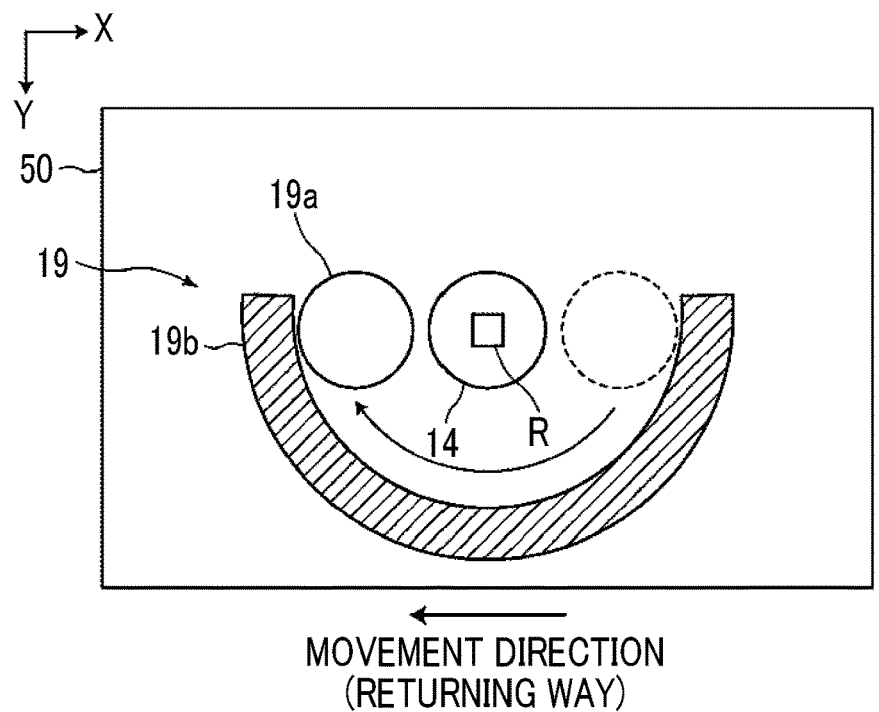
FIG. 13 is a diagram illustrating switching between positions of displacement sensors in the detection section of the observation device according to the second embodiment of the present invention.

FIGS. 12 and 13 are diagrams showing a specific configuration of the detection section 19. As shown in FIGS. 12 and 13, the detection section 19 includes a displacement sensor 19a and a guide mechanism 19b that guides the displacement sensor 19a to move its position.

The displacement sensor 19a is the same as the first displacement sensors 18a and second displacement sensors 18b of the first embodiment. That is, the displacement sensor 19a is configured of a laser displacement sensor.

The guide mechanism 19b includes a semicircular arc-shaped guide member, so that the displacement sensor 19a is moved along the guide member. The guide member moves the displacement sensor 19a from one side to the other side in the X direction with the imaging optical system 14 being interposed therebetween.

FIG. 12 is a diagram showing a position of the displacement sensor 19a in a case where a movement direction of the observation region R is an arrow direction in FIG. 12 (a rightward direction in FIG. 12). On the other hand, FIG. 13 is a diagram showing a position of the displacement sensor 19a in a case where the movement direction of the observation region R is an arrow direction in FIG. 13 (a leftward in FIG. 13). In a case where the movement direction of the observation region R is changed to the arrow direction in FIG. 13 from the arrow direction in FIG. 12, the displacement sensor 19a is moved from the position shown in FIG. 12 along the guide member of the guide mechanism 19b, and is changed to the position shown in FIG. 13.

In this embodiment, the above-described guide mechanism 19b is provided as a displacement sensor moving mechanism for moving the position of the displacement sensor 19a, but the configuration of the displacement sensor moving mechanism is not limited thereto, and other configurations may be used as long as the position of the displacement sensor 19a is capable of being similarly changed.

The other configurations and operations of the microscope observation system of the second embodiment are the same as in the microscope observation system of the first embodiment.

In the first and second embodiments, the operating section 15 performs the auto-focus control using the first to seventh operating sections 15A to 15G. Alternatively, only the first to fourth operating sections 15A to 15D and the sixth and seventh operating sections 15F and 15G may be included. In addition, the auto-focus control may be performed using only one of the first to fourth operating sections 15A to 15D and the sixth and seventh operating sections 15F and 15G. In this case, the auto-focus control may be performed by further using the fifth operating section 15E. Only one of the first to fourth operating sections 15A to 15D and the sixth and seventh operating sections 15F and 15G may be included. In this case, the fifth operating section 15E may be further included, and the auto-focus control may be performed by further using the fifth operating section 15E. The auto-focus control may be performed using a plurality of operating sections among the first to fourth operating sections 15A to 15D and the sixth and seventh operating sections 15F and 15G. In this case, the auto-focus control may be performed by further using the fifth operating section 15E.

In the first and second embodiments, the focal length changing optical system 70 is arranged between the imaging optical system 14 and the imaging element 16. Alternatively, the focal length changing optical system 70 may be arranged between the imaging optical system 14 and the stage 51.

In the first and second embodiments, the focal length of the imaging optical system 14 is changed by the first operating section 15A, the sixth operating section 15F, and the seventh operating section 15G. Alternatively, the focal length of the imaging optical system 14 may be changed by only one or two of the first operating section 15A, the sixth operating section 15F, and the seventh operating section 15G.

In the first and second embodiments, the cultivation container 50 is moved in the optical axis direction by moving the stage 51 in the optical axis direction by the fourth operating section 15D. However, instead of moving the stage 51 in the optical axis direction, a mechanism that moves the cultivation container 50 in the optical axis direction may be provided, and only the cultivation container 50 may be moved in the optical axis direction.

Figure 14:
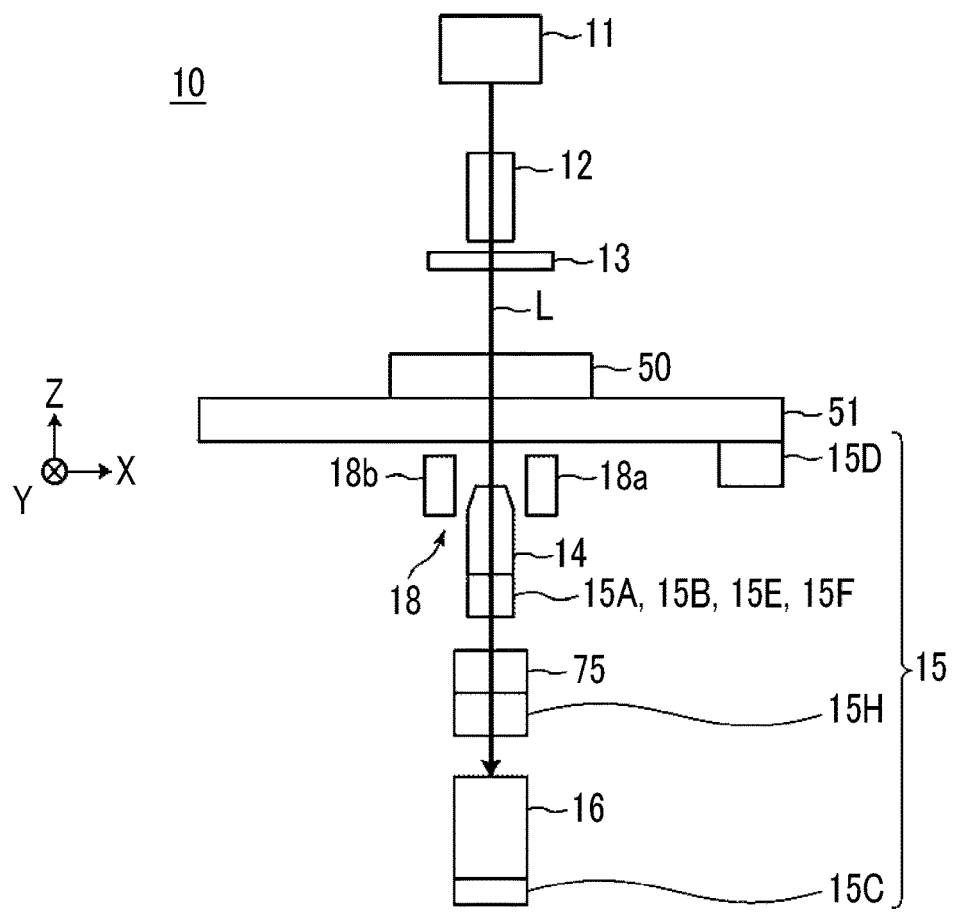
FIG. 14 is a diagram showing a schematic configuration of modification examples of a microscope observation system that uses an observation device according to a first embodiment of the present invention.

In the first and second embodiments, an optical system in which the first and second wedge prisms 71 and 72 are moved is used as the focal length changing optical system 70 for changing the focal length of the imaging optical system 14. However, an optical element having a changeable focal length like a liquid lens, a liquid crystal lens, and a shape changing lens may be used as the focal length changing optical system. For example, instead of the focal length changing optical system 70 in which the first and second wedge prisms 71 and 72 are moved, a focal length changing optical system 75 consisting of an optical element having a changeable focal length may be arranged between the imaging optical system 14 and the imaging element 16 as shown in FIG. 14. In this case, the focal length of the focal length changing optical system 75 is changed by changing the applied voltage by an eighth operating section 15H. The focal length changing optical system 75 may be arranged between the imaging optical system 14 and the stage 51. The focal length changing optical system 75 may be arranged in addition to the focal length changing optical system 70.

Next, modification examples of the microscope observation systems of the above-described first and second embodiments will be described. In the microscope observation systems of the first and second embodiments, the Z-directional position of the cultivation container 50 is detected by the detection section 18 or 19, and the auto-focus control is performed using the detected information. However, for example, in a case where the bottom portion of the cultivation container 50 is provided above the surface of the stage 51 for providing the cultivation container 50, or in a case where the bottom portion of the cultivation container 50 is thick, the distance between the imaging optical system 14 and the bottom surface of the cultivation container 50 is increased. Thus, even in a case where the focal lengths of the objective lens 14b and the imaging lens 14d are adjusted to the maximum focal length by the imaging lens 14d, the imaging element 16, the stage 51, and the objective lens 14b are moved in the Z direction to the maximum extent, the position of the bottom surface of the cultivation container 50 may not be included within the range of a depth of field of the imaging optical system 14.

Thus, it is preferable to perform calibration in advance so that the position of the bottom surface of the cultivation container 50 is necessarily included in the range of the depth of field of the imaging optical system 14 by the above-described auto-focus control.

Figure 15:
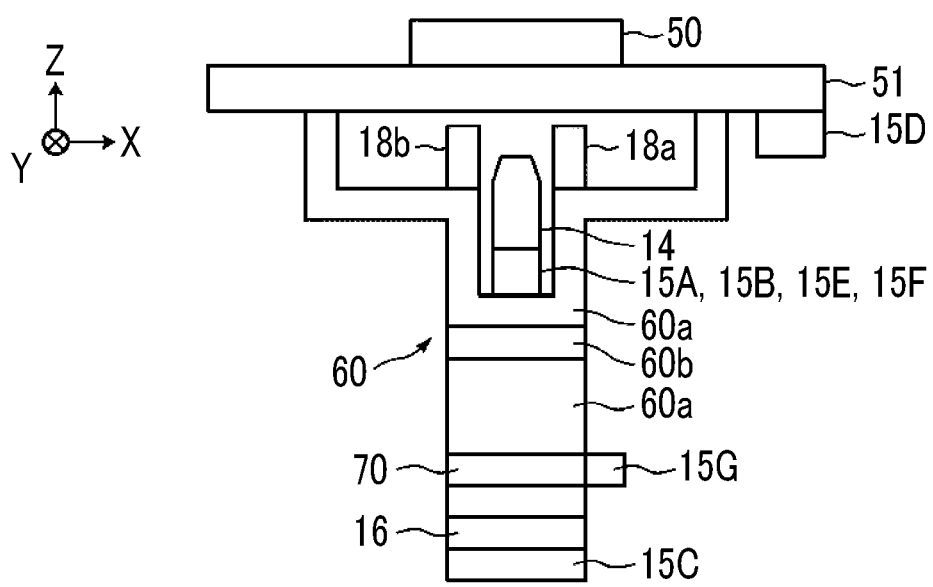
FIG. 15 is a diagram showing an example in which a vertical moving mechanism is provided with respect to the microscope observation system that uses the observation device according to the first embodiment of the present invention.

Specifically, for example, in the microscope observation system of the first embodiment, it is preferable to provide a vertical moving mechanism that integrally moves the imaging optical system 14, the operating section 15 (that is, the first to seventh operating sections 15A to 15G), the imaging element 16, the stage 51, the first displacement sensor 18a, and the second displacement sensor 18b in the Z direction. FIG. 15 is a diagram showing an example in which a vertical moving mechanism is provided in the microscope observation system according to the first embodiment. As shown in FIG. 15, the vertical moving mechanism 60 includes a holding section 60a that integrally holds the imaging optical system 14, the operating section 15, the imaging element 16, the stage 51, the first displacement sensor 18a, and the second displacement sensor 18b, and a Z-directional driving section 60b that moves the holding section 60a in the Z direction.

The holding section 60a holds the imaging optical system 14, the operating section 15, the imaging element 16, the stage 51, the first displacement sensor 18a, and the second displacement sensor 18b in a state where relative positional relationships between these are maintained as they are. The Z-directional driving section 60b includes an actuator such as a piezoelectric element, for example. The vertical moving mechanism 60 is configured to pass a phase difference image formed by the imaging optical system 14 as it is.

Further, before the above-described capturing of the phase difference image is performed, by integrally moving the imaging optical system 14, the operating section 15, the imaging element 16, the stage 51, the first displacement sensor 18a, and the second displacement sensor 18b in the Z direction using the vertical moving mechanism 60, calibration of an auto-focus control is performed.

Specifically, in the calibration, first, the focal lengths of the objective lens 14b and the imaging lens 14d are set to a reference focal length by driving the operating section 15, and the Z-directional positions of the imaging lens 14d, the imaging element 16, the stage 51, and the objective lens 14b are set to a reference position. The reference focal length is a focal length as a reference in the auto-focus control and is a focal length as a center value between the maximum focal length and the minimum focal length of the objective lens 14b and the imaging lens 14d. The Z-directional reference position is a position as a reference in the auto-focus control and is the center position of a Z-directional movement range of the imaging lens 14d, the imaging element 16, the stage 51, and the objective lens 14b. In the calibration, the position of the focal length changing optical system 70 in a direction orthogonal to the Z direction is set as the reference position. The reference position in the direction orthogonal to the Z direction is the center position of the movement range of the first and second wedge prisms 71 and 72 constituting the focal length changing optical system 70 in the direction orthogonal to the Z direction.

Then, an image formed by the imaging optical system 14 is detected by the imaging element 16 at each position while moving the holding section 60a in the Z direction by a predetermined interval by the Z-directional driving section 60b, and a phase difference image at each position of movement is acquired. Further, a position where contrast of the phase difference image becomes maximum is detected. With respect to the position where the contrast of the phase difference image becomes maximum, for example, a position at which a phase difference image is not focused in a case where the holding section 60a is sequentially moved upward in the vertical direction and a position where a phase difference image is not focused in a case where the holding section 60a is sequentially moved downward in the vertical direction may be detected, and a central position between the detected positions may be detected as the position where the contrast of the phase difference images becomes maximum. Here, the focal lengths of the objective lens 14b and the imaging lens 14*d* may be changed. In this embodiment, the calibration is performed in a state where the focal lengths of the objective lens 14*b* and the imaging lens 14*d* are fixed at the reference focal length.

Further, the position where the contrast of the phase difference image becomes maximum is set as the reference position of the vertical moving mechanism 60, and then, the calibration is terminated. The calibration may be performed at a central position of a bottom portion of the cultivation container 50, for example, but may be performed at plural locations of the bottom portion of the cultivation container 50. In this case, an average of reference positions that are respectively detected at the plural locations may be set as a final reference position.

Figure 16:
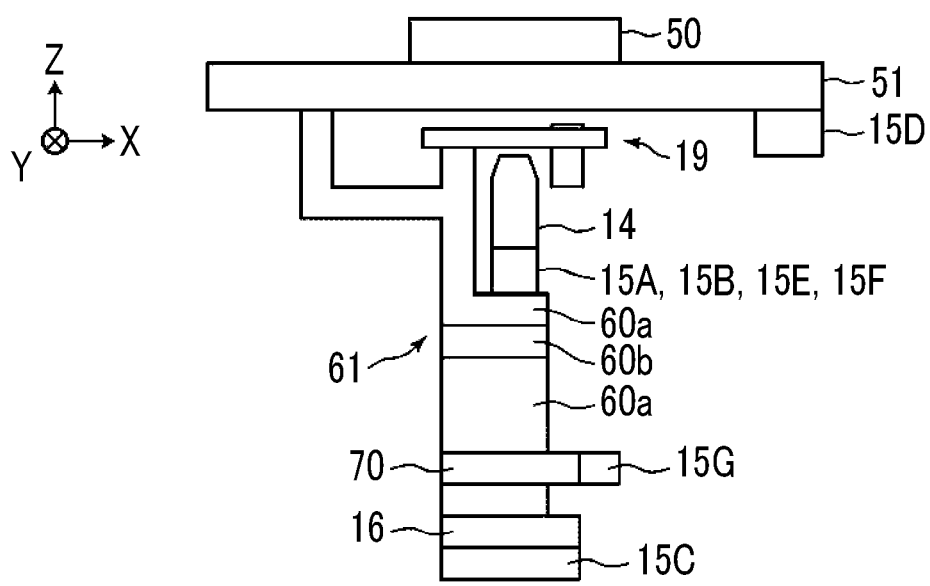
FIG. 16 is a diagram showing an example in which a vertical moving mechanism is provided with respect to the microscope observation system that uses the observation device according to the second embodiment of the present invention.

FIG. 16 is a diagram showing an example in which a vertical moving mechanism is provided in the microscope observation system according to the second embodiment. As shown in FIG. 16, the vertical moving mechanism 61 includes a holding section 61*a* that integrally holds the imaging optical system 14, the operating section 15, the imaging element 16, the stage 51, and the detection section 19, and a Z-directional driving section 61*b* that moves the holding section 61*a* in the Z direction.

The holding section 61*a* holds the imaging optical system 14, the operating section 15, the imaging element 16, the stage 51, and the displacement sensor 19*a* of the detection section 19 in a state where relative positional relationships between these are maintained as they are. The Z-directional driving section 61*b* includes an actuator such as a piezoelectric element, for example, in a similar way to the above-described Z-directional driving section 60*b*.

A method of calibration in the microscope observation system of the second embodiment is the same as the method in the case of the microscope observation system of the first embodiment. Thus, the method will not be described in detail here.

Figure 17:
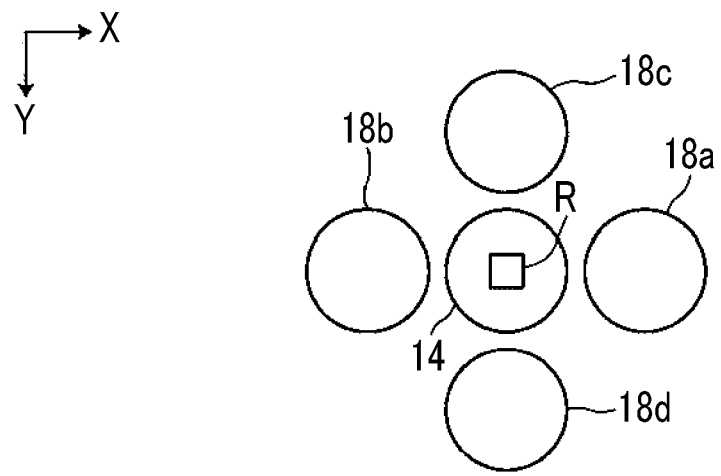
FIG. 17 is a diagram showing a modification example in which four displacement sensors are provided in the observation device according to the first embodiment of the present invention.

In the first embodiment, the first displacement sensor 18*a* and the second displacement sensor 18*b* are provided in parallel in the X direction with the phase difference lens 14*a* being interposed therebetween. Further, a third displacement sensor 18*c* and a fourth displacement sensor 18*d* may be provided in parallel in the Y direction with the phase difference lens 14*a* being interposed therebetween as shown in FIG. 17.

Figure 18:
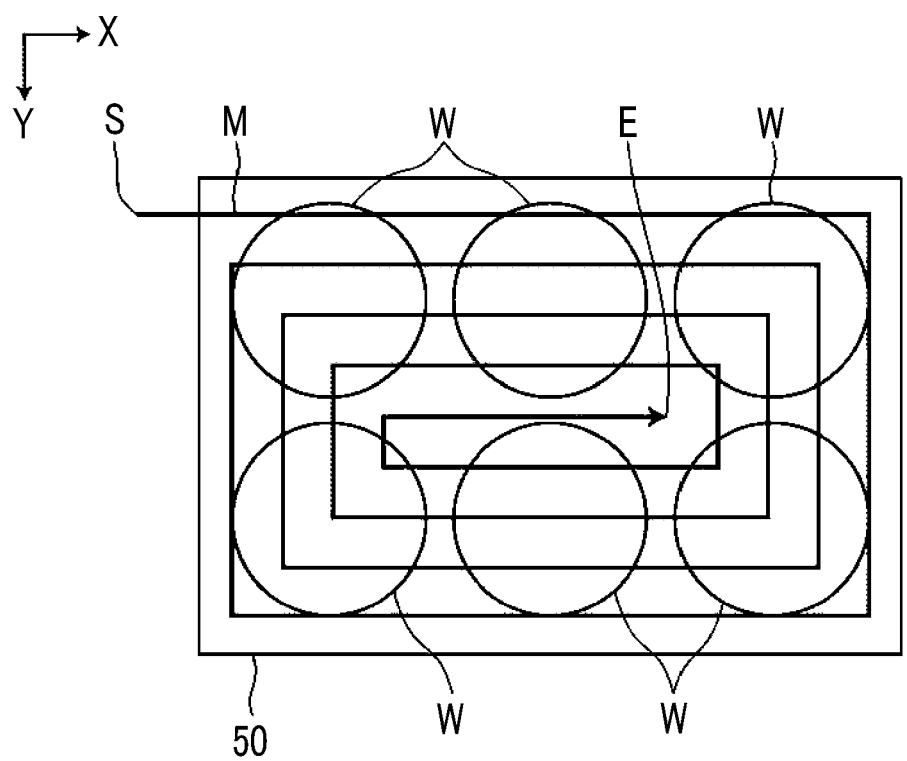
FIG. 18 is a diagram illustrating another example of the scanning position of the observation region in the cultivation container.

Accordingly, not only the observation region R can reciprocate but also can move as shown in FIG. 18. That is, in FIG. 18, the observation R is moved in the positive direction of the X direction (leftward direction in FIG. 18) from the scanning start point S and then, is moved in the positive direction of the Y direction (downward direction in FIG. 18). Next, the observation region R is moved in the negative direction of the X direction (leftward direction in FIG. 18) and is further moved in the negative direction of the Y direction (upward direction in FIG. 18). In this way, by repeating the movement of the observation region R in the X direction and the Y direction, the inside of the cultivation container 50 can be scanned in a two-dimensional form.

Figure 19:
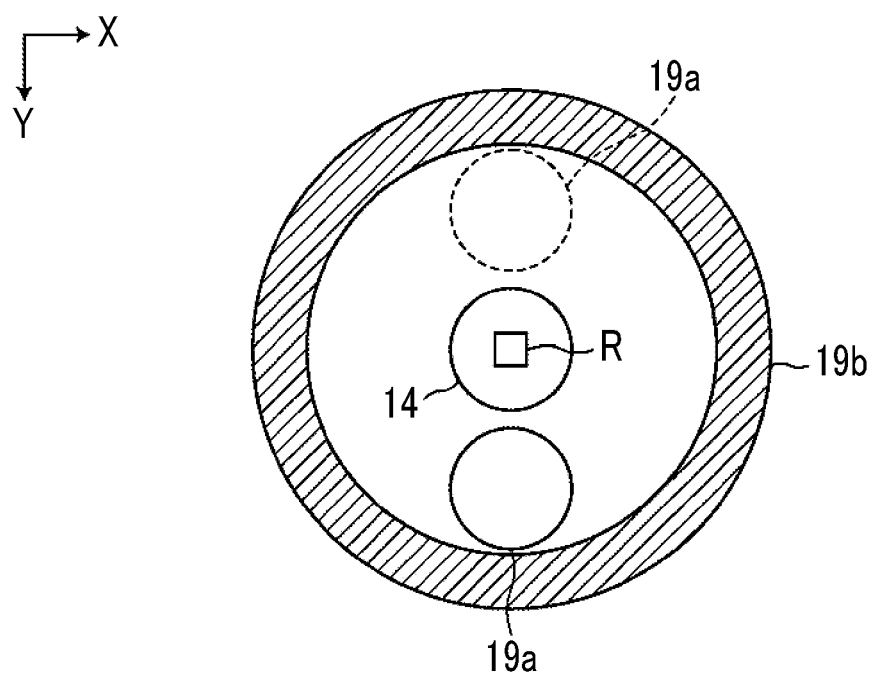
FIG. 19 is a diagram illustrating switching between positions of displacement sensors in modification examples of the observation device according to the second embodiment of the present invention.

In addition, as shown in FIG. 19, a guide mechanism 19*b* of the detection section 19 in the second embodiment may be formed in a circular shape, and the displacement sensor 19*a* may be moved along the guide mechanism 19*b* of the circular shape. Accordingly, even in the second embodiment, the observation region R can be moved in a two-dimensional form as shown in FIG. 18. In this case, in a case where the observation region R is moved in the positive direction of the X direction, the displacement sensor 19*a* is moved to the position shown in FIG. 12. In a case where the observation region R is moved in the positive direction of the Y direction, the displacement sensor 19*a* is moved to a position shown by a solid line in FIG. 19. In a case where the observation region R is moved in the negative direction of the X direction, the displacement sensor 19*a* is moved to the position shown in FIG. 13. In a case where the observation region R is moved in the negative direction of the Y direction, the displacement sensor 19*a* is moved to a position shown by a broken line in FIG. 19.

In the second embodiment, the detection section 19 includes one displacement sensor 19*a* but is not limited thereto. The detection section 19 may include two or more displacement sensors 19*a*. For example, the detection section 19 may include the guide mechanism 19*b* of the circular shape and two displacement sensors 19*a* as shown in FIG. 19. In accordance with the movement direction of the observation region R, one displacement sensor 19*a* may be moved between the position shown in FIG. 12 and the position shown by the solid line in FIG. 19, and the other displacement sensor 19*a* may be moved between the position shown in FIG. 13 and the position shown by the broken line in FIG. 19.

In each of the above-described embodiments, the observation region R is moved by moving the stage 51 but is not limited thereto. The scanning of the observation region R of the cultivation container 50 may be performed by fixing the stage 51 and moving the observation region R by moving the imaging optical system 14 and other configurations related to the capturing of the phase difference image. Alternatively, the scanning of the observation region R may be performed by moving all of the stage 51, the imaging optical system 14, and the other configurations related to the capturing of the phase difference image.

Further, in each of the above-described embodiments, the present invention is applied to a phase difference microscope, but the present invention is not limited to the phase difference microscope, and may be applied to a different microscope such as a differential interference microscope or a bright field microscope.

In addition, in each of the above-described embodiments, a configuration in which a phase difference image formed by the imaging optical system 14 is captured by the imaging element 16 is shown, but a configuration in which an imaging element is not provided and an observation optical system or the like is provided so that a user is able to directly observe a phase difference image of an observation target formed by the imaging optical system 14 may be used. In this case, the auto-focus control may be performed by providing at least one of the first operating section 15A, the second operating section 15B, the fourth operating section 15D, the sixth operating section 15F, or the seventh operating section 15G in the observation device. In this case, the auto-focus control may be performed by further providing the fifth operating section 15E. The auto-focus control may be performed by providing the focal length changing optical system 75 and the eighth operating section 15H instead of the focal length changing optical system 70 and the seventh operating section 15G.

Hereinafter, an effect of this embodiment will be described.

By performing a plurality of operations among the first operation, the second operation, the third operation, and the fourth operation, the auto-focus can be performed at a higher speed than the auto-focus control performed by only one operation.

By performing the fifth operation of moving the objective lens in the optical axis direction, the auto-focus can be performed at a higher speed than the auto-focus control performed by only one operation.

EXPLANATION OF REFERENCES

10: microscope device
11: white light source
12: condenser lens
13: slit plate
14: imaging optical system
14a: phase difference lens
14b: objective lens
14c: phase plate
14d: imaging lens
15: operating section
15A: first operating section
15B: second operating section
15C: third operating section
15D: fourth operating section
15E: fifth operating section
15F: sixth operating section
15G: seventh operating section
15H: eighth operating section
16: imaging element
17: horizontal driving section
18: detection section
18a: first displacement sensor
18b: second displacement sensor
18c: third displacement sensor
18d: fourth displacement sensor
19: detection section
19a: displacement sensor
19b: guide mechanism
20: microscope control device
21: operation controller
22: scanning controller
23: display controller
30: display device
40: input device
50: cultivation container
51: stage
51a: opening
60, 61: vertical moving mechanism
60a, 61a: holding section
60b, 61b: Z-directional driving section
70, 75: focal length changing optical system
71: first wedge prism
72: second wedge prism
S: scanning start point
E: scanning end point
L: illumination light
M: solid line showing scanning position of observation region
Pd: detected position
Pr: position of observation region R contiguous to detected position Pd
R: observation region
R1, R2: acceleration/deceleration region
W: well

What is claimed is:

1. An observation device comprising:
   an imaging optical system that includes an imaging lens forming an image of an observation target in a container accommodating the observation target;
   an imaging system that includes an imaging element capturing the image of the observation target formed by the imaging optical system;
   an operating section that performs at least one of a first operation of changing a focal length of the imaging optical system, a second operation of moving the imaging lens in an optical axis direction of the imaging lens, a third operation of moving the imaging element in the optical axis direction, or a fourth operation of moving the container in the optical axis direction;
   a detection section that includes at least one displacement sensor detecting a vertical position of the container;
   an operation controller that controls the operating section based on the vertical position of the container detected by the detection section;
   a horizontal driving section that moves at least one of the container or the imaging optical system in a horizontal plane; and
   a scanning controller that scans the container by controlling the horizontal driving section to move an observation region of the imaging optical system,
   wherein the detection section detects the vertical position of the container at a forward position in a scanning direction of the observation region in a movement direction with reference to a position of the observation region of the imaging optical system with respect to the container and changes a position of the displacement sensor or the displacement sensor to be used in accordance with a change of the movement direction of the observation region.

2. The observation device according to claim 1, wherein the operating section performs a plurality of operations among the first operation, the second operation, the third operation, and the fourth operation.

3. The observation device according to claim 1, wherein the imaging optical system further includes an objective lens, and
   the first operation includes at least one of an operation of changing a focal length of the imaging lens or an operation of changing a focal length of the objective lens.

4. The observation device according to claim 3, wherein the operating section further performs a fifth operation of moving the objective lens in the optical axis direction.

5. The observation device according to claim 1, further comprising:
   an optical system that changes the focal length of the imaging optical system,
   wherein the imaging optical system further includes an objective lens, and
   the first operation includes at least one of an operation of changing a focal length of the imaging lens, an operation of changing a focal length of the objective lens, or an operation of changing the focal length of the imaging optical system by the focal length changing optical system.

6. The observation device according to claim 1, further comprising:
   an optical system that changes the focal length of the imaging optical system,
   wherein the first operation includes an operation of changing the focal length of the imaging optical system by the focal length changing optical system.

7. The observation device according to claim 1, wherein the imaging optical system further includes an objective lens, and
   the operating section further performs a fifth operation of moving the objective lens in the optical axis direction.

8. The observation device according to claim 1,
wherein the detection section includes at least two displacement sensors that are provided in parallel in the movement direction of the observation region with the imaging optical system being interposed therebetween, and changes the displacement sensor to be used in accordance with the change of the movement direction of the observation region.

9. The observation device according to claim 1,
wherein the detection section includes a displacement sensor moving mechanism capable of moving the displacement sensor in the movement direction of the observation region between one side and the other side with the imaging optical system being interposed therebetween, and moves the position of the displacement sensor from the one side to the other side in accordance with the change of the movement direction of the observation region.

10. The observation device according to claim 9,
wherein the displacement sensor moving mechanism includes a guide mechanism that guides the displacement sensor from the one side to the other side.

11. The observation device according to claim 1,
wherein after the vertical position of the container is detected by the detection section, the operation controller controls the operating section at a time point when a predetermined time elapses.

12. The observation device according to claim 11,
wherein after the vertical position of the container is detected by the detection section, the operation controller controls the operating section at a time point when the observation region of the imaging optical system reaches the detected position or immediately before the observation region of the imaging optical system reaches the detected position.

13. The observation device according to claim 11,
wherein the operation controller changes, in a case where a moving velocity of at least one of the container or the imaging optical system is changed by the scanning controller, the predetermined time in accordance with the moving velocity after the change.

14. The observation device according to claim 1,
wherein in a case where the horizontal driving section causes at least one of the container or the imaging optical system to reciprocate, an acceleration/deceleration region of the reciprocation of at least one of the container or the imaging optical system is set on both sides of a range of the container in a direction of the reciprocation, and a width of the acceleration/deceleration region in the direction of the reciprocation is the same as an interval between the imaging optical system and the displacement sensor in the direction of the reciprocation.

15. The observation device according to claim 1,
wherein the displacement sensor is a laser displacement sensor.

16. The observation device according to claim 1, further comprising:
a vertical moving mechanism that integrally moves the imaging optical system, the operating section, and the displacement sensor in a vertical direction.

17. An observation method for moving at least one of a container accommodating an observation target or an imaging optical system including an imaging lens forming an image of the observation target in the container in a horizontal plane, and capturing the image of the observation target formed by the imaging optical system by an imaging element, the method comprising:
a step of detecting a vertical position of the container at a forward position in a scanning direction of an observation region in a movement direction with reference to a position of the observation region of the imaging optical system with respect to the container using at least one displacement sensor;
a step of performing based on the detected vertical position of the container at least one of a first operation of changing a focal length of the imaging optical system, a second operation of moving the imaging lens in an optical axis direction, a third operation of moving the imaging element in the optical axis direction, or a fourth operation of moving the container in the optical axis direction; and
a step of changing a position of the displacement sensor or the displacement sensor to be used in accordance with a change of a movement direction of the observation region.

18. A non-transitory computer readable recording medium storing an observation device control program causing a computer to execute a procedure for moving at least one of a container accommodating an observation target or an imaging optical system including an imaging lens forming an image of the observation target in the container in a horizontal plane, and capturing the image of the observation target formed by the imaging optical system by an imaging element, the program causing the computer to execute:
a procedure of detecting a vertical position of the container at a forward position in a scanning direction of an observation region in a movement direction with reference to a position of the observation region of the imaging optical system with respect to the container using at least one displacement sensor;
a procedure of performing based on the detected vertical position of the at least one of a first operation of changing a focal length of the imaging optical system, a second operation of moving the imaging lens in an optical axis direction, a third operation of moving the imaging element in the optical axis direction, or a fourth operation of moving the container in the optical axis direction container; and
a procedure of changing a position of the displacement sensor or the displacement sensor to be used in accordance with a change of a movement direction of the observation region.

* * * * *